United States Patent
Reihl et al.

(10) Patent No.: US 11,263,449 B2
(45) Date of Patent: *Mar. 1, 2022

(54) AUTOMATED COMMUNICATION DESIGN CONSTRUCTION SYSTEM

(71) Applicant: Shutterfly, LLC, Redwood City, CA (US)

(72) Inventors: Aaron P. Reihl, St. Michael, MN (US); Sairam Vangapally, Shakopee, MN (US); Aaron Gregory Rasset, Kimball, MN (US)

(73) Assignee: Shutterfly, LLC, Redwood City, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/672,945

(22) Filed: Nov. 4, 2019

(65) Prior Publication Data

US 2020/0065575 A1    Feb. 27, 2020

Related U.S. Application Data

(63) Continuation of application No. 15/911,564, filed on Mar. 5, 2018, now Pat. No. 10,503,972.

(51) Int. Cl.
*G06K 9/00* (2006.01)
*G06K 9/32* (2006.01)
*G06F 40/295* (2020.01)

(52) U.S. Cl.
CPC ....... *G06K 9/00463* (2013.01); *G06F 40/295* (2020.01); *G06K 9/00469* (2013.01); *G06K 9/325* (2013.01)

(58) Field of Classification Search
CPC ........... G06K 9/00463; G06K 9/00469; G06K 9/325; G06F 17/278; G06F 17/2247; G06F 17/2264; G06F 17/227; G06F 17/27; G06F 16/122; G06F 16/168; G06F 16/173; G06Q 30/06
See application file for complete search history.

(56) References Cited

U.S. PATENT DOCUMENTS

| | | |
|---|---|---|
| 2002/0099735 A1 | 7/2002 | Shroeder |
| 2006/0104511 A1 | 5/2006 | Guo |
| 2017/0308335 A1 | 10/2017 | Keane |
| 2019/0108236 A1 | 4/2019 | Balachandran |

*Primary Examiner* — Jianxun Yang
(74) *Attorney, Agent, or Firm* — Merchant & Gould P.C.

(57) ABSTRACT

An automated communication design analysis and construction system that includes one or more intelligent communication design servers, comprising: a normalization module that converts communication content files for different recipients to normalized intermediate format files; an objects identification and quantification module that identifies text objects and image objects in the normalized intermediate format files; a cross-recipient group analysis module configured to identify static global objects that are invariant between recipients, data variables, and variable global objects that vary between recipients in the normalized intermediate format files; and an intelligent communication content learning and constructing engine that can construct standard communication design files based on the static global objects, the data variables, and the variable global objects. A data storage stores the communication content files and the standard communication design files. A communication resource allocation server sends the standard communication design files to one or more product fulfillment centers.

19 Claims, 24 Drawing Sheets

AUTOMATED COMMUNICATION DESIGN CONSTRUCTION SYSTEM

TECHNICAL FIELD

This application relates to technologies for automatically constructing and producing communication designs to provide physical and electronic communication services.

BACKGROUND OF THE INVENTION

In modern economy, businesses must engage with their customers with frequent and purposeful communications. The content and the methods of the communications are often customized for individual customers, which may rely on data and logic to trigger and populate the appropriate custom messaging. Communications can be delivered in physical mails or electronic forms such as emails, social media, and mobile messages, and these various channels may share a large volume of common messaging, branding guidelines, and/or legal requirements compounding the complexity of managing and executing these communications. As business grow through mergers, acquisitions, or purely organically, the size of the communication materials they have to manage and control grows exponentially.

There is a need for efficiently designing and analyzing communication content, and producing and distributing communications in physical and electronic forms.

SUMMARY OF THE INVENTION

In one aspect, the present application discloses system and methods that can allocate communication resources to satisfy business customers' complex and varying needs in providing communications to their customers. The communications can be in the form of the mailed hardcopy print products in different sizes, form factors, materials, finishes, and packaging, as well as electronic channels such as emails, social media, and mobile messages.

The presently disclosed system can automatically monitor resources required for fulfilling physical and electronic communications, and can automatically evaluate the resource needs in customers' requests for communications and allocate resources based on the availability of resources needed for the design, the production, and the distribution of physical or electronic communications.

In another important aspect, the presently disclosed system and methods use machine learning to analyze communication content files in different formats from different sources. Objects in the communication content files are automatically recognized and sorted in different categories including static and variable objects, and local and global objects, or any combination thereof. The objects are quantized, normalized, which are defined by rules and stored in a unified data structure for all communication content. A communication design file can then be produced based on the unified data structure.

Moreover, the present disclosure provides systems and methods for automatically checking consistencies and logic relationships between objects in the communication content and designs. After the automated checking, the disclosed systems and methods also provide effective tools for users to verify consistencies between objects.

Furthermore, by constructing a unified data structure for all different communication types and formats, the disclosed system and methods can facilitate efficient reuse of variable design content such as style, layouts, backgrounds, colors, and text and image objects between different communications.

The disclosed system and method can perform deep analysis of several communication examples across multiple communication channels to generate an optimized library of content and logic for production execution. They can drastically reduce labor, time, and cost in formatting, proofing, and content building in conventional customer content onboarding and pre-production processes. The automated systems also reduce human error and the need for rework in these processes therefore increasing quality and accuracy of communication execution.

In a general aspect, the present invention relates to an automated communication design analysis and construction system that includes one or more intelligent communication design servers, comprising: a normalization module that can convert communication content files for different recipients to normalized intermediate format files; an objects identification and quantification module that can identify text objects and image objects in the normalized intermediate format files; a cross-recipient group analysis module that can identify static global objects that are invariant between recipients, data variables, and variable global objects that vary between recipients in the normalized intermediate format files; and an intelligent communication content learning and constructing engine that can construct standard communication design files based on the static global objects, the data variables, and the variable global objects; and a data storage configured to store the communication content files and the standard communication design files; and a communication resource allocation server that can send the standard communication design files to one or more product fulfillment centers, wherein physical mailing pieces to be mailed to the recipients are printed and finished based on the standard communication design files.

Implementations of the system may include one or more of the following. The data storage can store a unified file structure for the normalized intermediate format files, wherein the unified file structure defines the static global objects, the data variables, and the variable global objects for communications to different recipients. The intelligent communication content learning and constructing engine can automatically recognize font type, font size, and font color of a text in the text objects. The automated communication design construction system can further include a zone-classification module configured to automatically identify zones in the normalized intermediate format files according to the text object, logos, and the image objects identified by the machine learning and design construction engine in the normalized intermediate format files. The intelligent communication content learning and constructing engine can automatically identify wireframes, page behaviors, and paragraph styles within the zones. The static global objects can include wireframes, page behaviors, and paragraph styles that are common to different recipients. The variable global objects can include wireframes, page behaviors, and paragraph styles that vary between recipients. The data storage can store a unified file structure for the normalized intermediate format files, wherein the unified file structure defines the wireframes, the page behaviors, and the paragraph styles for communications to different recipients. The zone-classification module can classify the zones into zone types based on behaviors across-recipients, wherein data storage comprises a content store configured to store standard content for a zone type. The standard content can be based on branding, legal, and regulatory requirements.

The static global objects can include text, logos, and images that are common to different recipients. The variable global objects can include text, logos, and images that vary between recipients. The data variables can vary between recipients. The automated communication design construction system can further include a channel classification module configured to automatically classify the normalized intermediate format files based on communication channel types, wherein the communication channel types include physical prints, e-mails, or web form. The automated communication design construction system can further include a recipient matching module configured to automatically sort the normalized intermediate format files into groups each representing all communication documents for a single recipient, wherein the recipient matching module is configured to automatically match each of the groups of normalized intermediate format files to a recipient. The cross-recipient group analysis module can automatically analyze similar zones in the normalized intermediate format files between different recipients to identify static global objects, data variables, and variable global objects, wherein the similar zones have a same content type and locations in respective page layouts. The cross-recipient group analysis module can identify static global objects, data variables, and variable global objects based on whether content in the similar zones the normalized intermediate format files vary across-recipients. The cross-recipient group analysis module can automatically identify a common wireframe in the normalized intermediate format files between different recipients based on locations of the zones and content in the zones. The automated communication design construction system can further include a cross-recipient group analysis module configured to automatically identify white spaces in the normalized intermediate format files using multi-class classification machine learning, wherein pre-stored content can be inserted into the white spaces.

These and other aspects, their implementations and other features are described in detail in the drawings, the description and the claims.

DETAILED DESCRIPTION OF THE INVENTION

Figure 1:
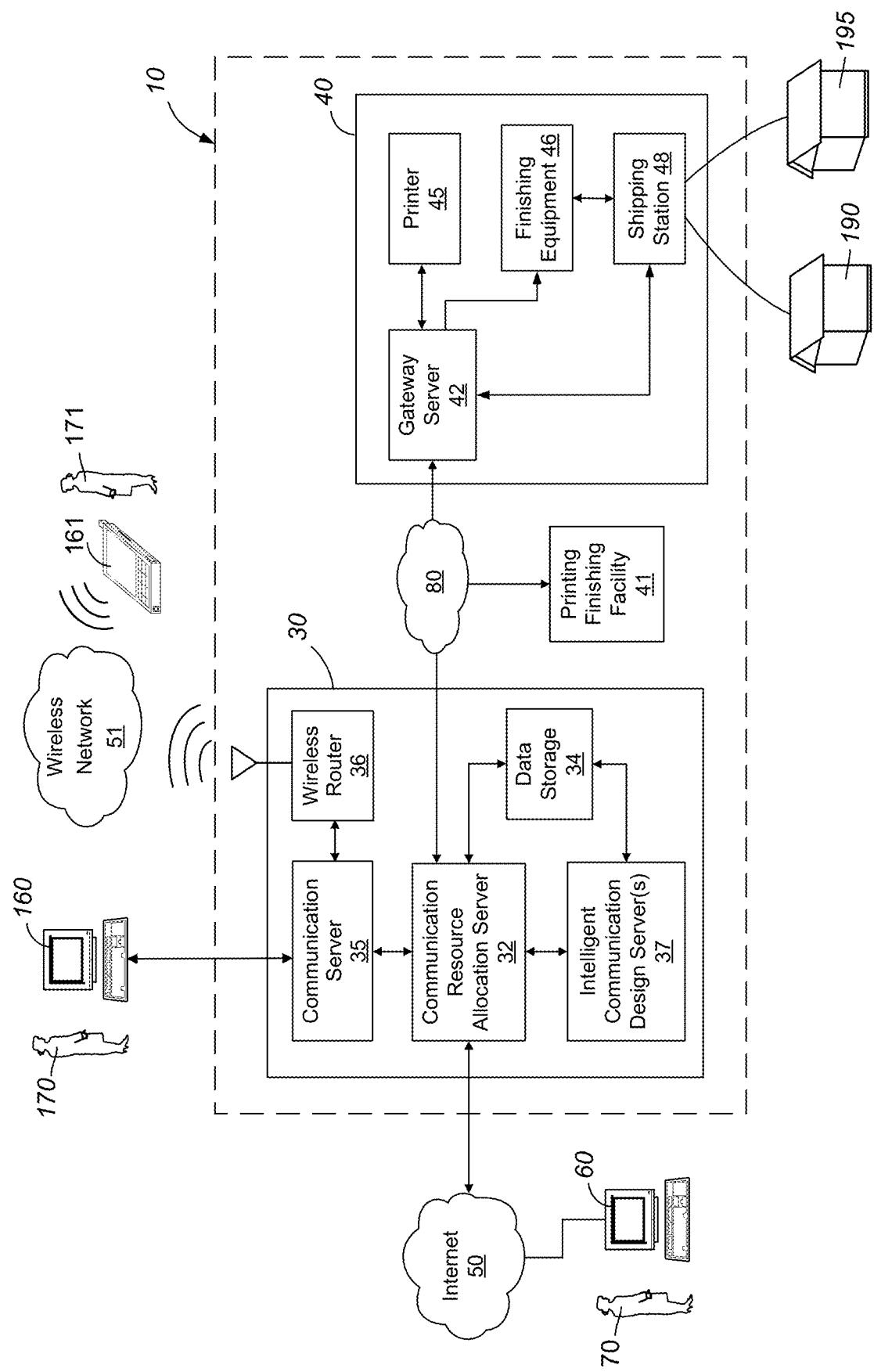
FIG. 1 is a block diagram for a network-based communication fulfillment system in accordance with the present invention.

Referring to FIG. 1, a network-based communication fulfillment system 10 includes a communication production and control system 30 and one or more product fulfillment centers 40, 41, which communicate with each other via a computer network 80. The network-based communication fulfillment system 10 can be operated by a communication service provider such as Shutterfly Business Solutions.

The communication resource allocation servers 32 can power a website and mobile applications, which are accessible by business owners such as a business user 70 using a computer device 60 such as a mobile device, a desktop computer. The network-based communication fulfillment system 10 receives requests for communication services from the business user 70 via the Internet 50 or a wireless network 51.

The requests can specify the types of communications, the content and design of the communications, the properties of the physical communications in the communication services, and recipients of the communications. The requests can also define the time(s) and frequencies of the communications to the recipients. The recipients are typically the current or potential customers of the business users.

The types of communications can include electronic forms such as emails, social media, and mobile messages, and physical mailing pieces of hardcopy print products. The content and design of the communications can include text, images, graphics, embellishments, colors and dimensions of all the design elements, layout, etc. for the electronic or physical communications. The properties of the physical mailing pieces can be defined by different sizes, form factors, materials, finishes, packaging, and shipping methods, etc. The recipient information can include the names and the physical and electronic addresses of the recipients and other additional demographic and/or behavioral data that a particular business user has accumulated about the recipients.

The product fulfillment center 40 includes a gateway server 42, printers 45 for printing the communication designs on physical surfaces of substrates, finishing equipment 46 for finishing the physical mailing pieces after printing, and a shipping station 48 for confirming the completion of the orders and shipping the physical mailing pieces to recipients 190 and 195. The gateway server 42 communicates with the communication production and control system 30 via the computer network 80 and facilitates the communications between different devices and stations in the printing and finishing facility 40. The printers 45 receive digital image data and control data, and reproduce images on physical substrates made of paper, fabrics, plastic, metals, or other materials. Examples of the printers 45 can be digital printing presses, digital photographic printers, offset digital printers, inkjet printers, etc. The finishing equipment 46 perform finishing operations after printing, for example, cutting, folding, adding a cover to photo book, punching, stapling, gluing, binding, envelope printing and sealing, packaging, labeling, package weighing, and postage metering, etc.

The communication production and control system 30 includes one or more communication resource allocation servers 32 for communicating with the business users 70, the product fulfillment centers 40, 41, a data storage 34, and other components within the communication production and control system 30. The communication production and control system 30 also includes one or more communication servers 35, one or more wireless routers 36, and one or more intelligent communication design servers 37. The communication production and control system 30 can be implemented in the cloud or with dedicated physical network equipment.

The data storage 34 stores information about the business customers and the recipients, the content and designs of the communications, and the types and timing of the communications. The servers 35 and the wireless routers 36 are configured to transmit electronic communications to recipients 170, 171 specified by the business users 70 in their requests. The electronic communications can be transmitted in wired or wireless communications to computers 160 or mobile devices 161 used by the recipients 170, 171.

The intelligent communication design server 37 is configured to create a customized design for the electronic or physical communications based on the input from the business owners 70. The content as well as transmission or shipping methods (timing, frequencies) are usually personalized for the recipients 170, 171, 190, 195 and based on the needs of the business owners. Customized design information can include text, images, graphics, embellishments, styles, product types, event types, information about the business user (i.e. sender of the communication), information about the recipient (names, special events/interests or occasion for the recipients, etc.).

Moreover, the designs of electronic communications such as emails, social media, and mobile messages can depend on the types of devices on which the recipients will view the electronic communications, the types of browsers for viewing the communications on webpages, the types of operating systems, and the types of social platforms. The page dimensions and form factors are usually different for different electronic communications; the communication designs need to be tailored according to the particular channels and the recipients' devices. In other words, for each communication service of a given content, there can be hundreds of electronic versions. Thus, designing electronic communications can consume significant computation resources.

Similarly, physical mailing pieces have different product types, sizes, form factors, materials, finishes, packaging, and shipping methods. Examples of physical mailing pieces can include post cards, note cards, greeting cards, invitation cards, brochures, booklet, calendars, magnets, catalogs, coupons, banners, posters, totes, which can be printed with photos, text, and graphics, etc. Each physical mailing piece can include one or more pages, or one or more substrate surfaces. Creating customized designs for the physical products not only depend on the sizes, form factors, materials, finishes, but also the types of printing and finishing equipment employed to produce these physical mailing pieces. Each recipient 190, 195 can receive one or more physical mailing pieces in a communication service fulfilled by the network-based communication fulfillment system 10.

Figure 2:
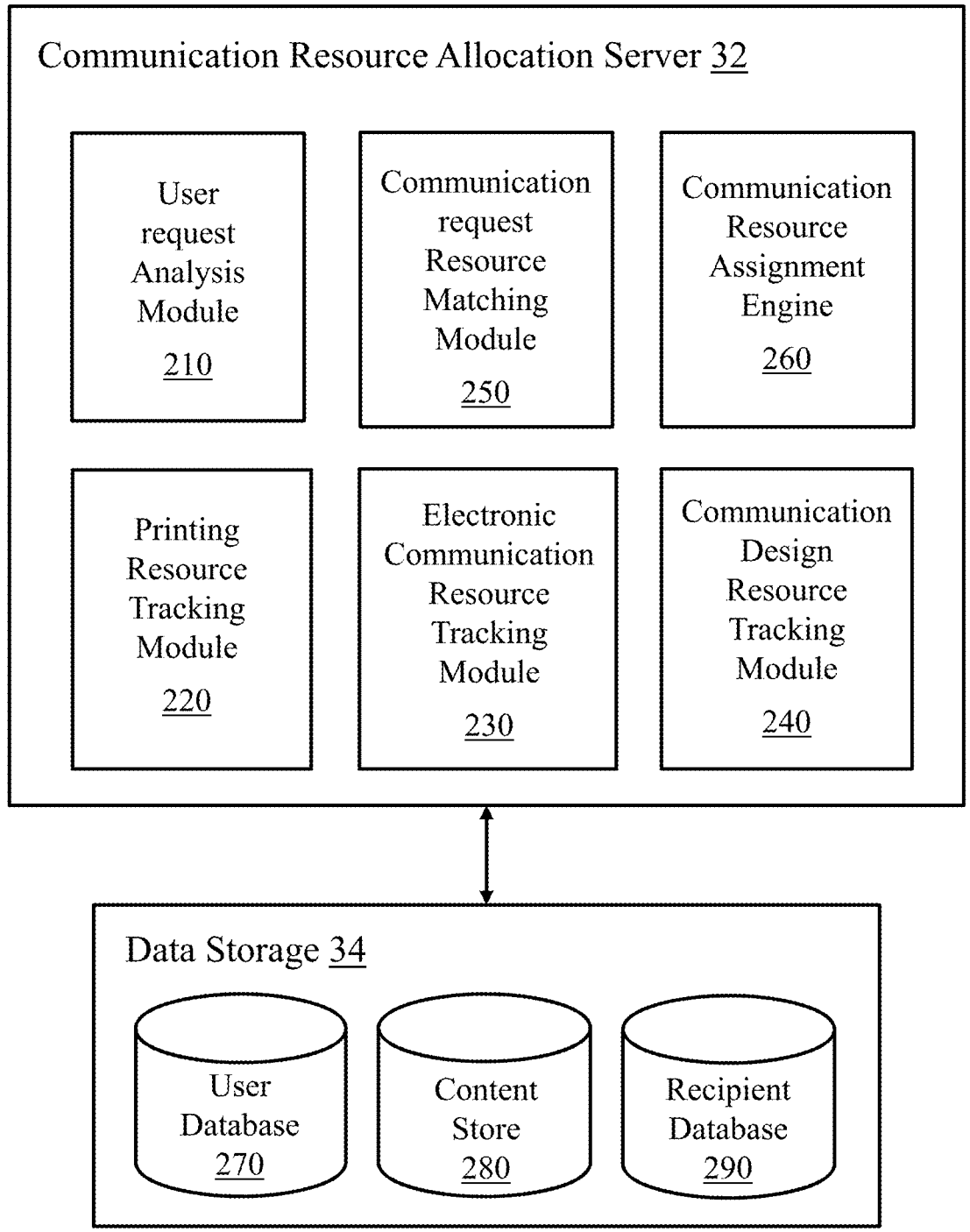
FIG. 2 is a detailed block diagram for a portion of the network-based communication fulfillment system in accordance with the present invention.

FIG. 2 illustrates detailed portions of the communication resource allocation servers 32 and the data storage 34 in the communication production and control system 30. The communication resource allocation server 32 is in communications with the servers and storage in communication production and control system 30 and with the gateway servers 42 in the product fulfillment centers 40, 41. In some embodiments, referring to FIGS. 1 and 2, the communication resource allocation server 32 includes a user request analysis module 210, a printing resource tracking module 220, an electronic communication resource tracking module 230, a communication design resource tracking module 240, a communication request resource matching module 250, and a communication resource assignment module 260.

The data storage 34 also includes a user database 270, a content store 280, and a recipient database 290. The user data stored in the user database 270 can include account information, discount information, and order information associated with the business users 70. The content store 280 stores the communication content specified in business users' requests, and the designs automatically created by the intelligent communication design servers 37 for different types of electronic or physical communications. The recipient database 290 stores information for a large number of recipients such as names, family members' names, their electronic and physical addresses, their anniversary or birthdays, their preferences and hobbies, communication histories, their response to past communications, etc. The recipient database 290 can also store the communication personalized for each recipient: communication delivery method, frequency, personalization, etc. For each business user 70, each communication service can include a different set of recipients, whose numbers can range from hundreds to millions.

The user request analysis module 210 is configured to automatically analyze business users' requests for communication services: determining the types of communications (physical vs. electronic, types of physical mailing pieces, electronic communication channels, etc.), determining the content (complexity text, image, graphics objects), accessing the amount of design work (e.g. level of customization, the number of variations of different electronic channels including device types, operating systems, types of viewing software, and viewing platforms, different types of physical mailing pieces, etc.), and assessing the amount of printing and finishing work for the physical mailing pieces.

The printing resource tracking module 220 monitors, via the gateway servers 42, the workloads of the product fulfillment centers 40, 41 on their respective schedules, which include capacity forecast for the printers 45, finishing equipment 46, and shipping stations 48. The electronic communication resource tracking module 230 monitors the workload of the communication servers 35 and wireless router 36. The number of electronic communications can be much higher than the number of physical communications. Moreover, the communication servers 35 and wireless router 36 may need to handle response and feedback from the computer devices (160, 161) by the recipients 170, 171. The communication design resource tracking module 240 monitors the anticipated workloads of the intelligent communication design servers 37 based on the communication services already committed to different business users 70. As described above, the amount of design work is dependent on the types of communications.

The communication request resource matching module 250 is configured to find communication resources for the communication services specified in business users' requests. For each communication request, the communication request resource matching module 250 receives all resource needs in the user request from the user request analysis module 210. The communication request resource matching module 250 also receives resource workload and availability information from the printing resource tracking module 220, the electronic communication resource tracking module 230, and the communication design resource tracking module 240. The communication request resource matching module 250 attempts to match the available design, printing, and transmission resources with resource needs in the user request.

Based the input information as above described, the communication request resource matching module 250 makes determination if a communication service can be fulfilled in the timeframe specified in the business user's request. It should be noted that there can be multiple product fulfillment centers 40, 41, multiple communication design centers, and multiple electronic communication resources, which the communication request resource matching module 250 is configured to balance. The tasks of one communication service can be distributed across different such service resource centers. If so, the communication resource assignment module 260 assigns the appropriate resources and schedule them to perform various tasks: designing communication content by the intelligent communication design servers 37 for all versions and channels, transmitting electronic messages and receiving response by the communication servers 35 and wireless router 36, and manufacturing and shipping physical mailing pieces by the product fulfillment centers 40, 41.

Otherwise, the communication resource allocation server 32 replies to the business user 70 and possibly suggests a different schedule from the first request. For example, if the product fulfillment centers 40, 41 are expected to be short in capacity for the requested communication service, the communication resource allocation server 32 may suggest and renegotiate extra time for the deliveries of the physical mailing pieces.

It should be noted that the communication resource allocation server 32 is also configured to communicate pricing information to the business users 70. The prices for electronic or physical communication depend on the complexities in content, volume, number of electronic channels and platform variations, and workloads in creating the design, transmission, and manufacturing the physical mailing pieces. The price can also depend on the urgency of the communication jobs. For example, communications services that can be schedule further into the future can be provided at discount prices.

Figure 3:
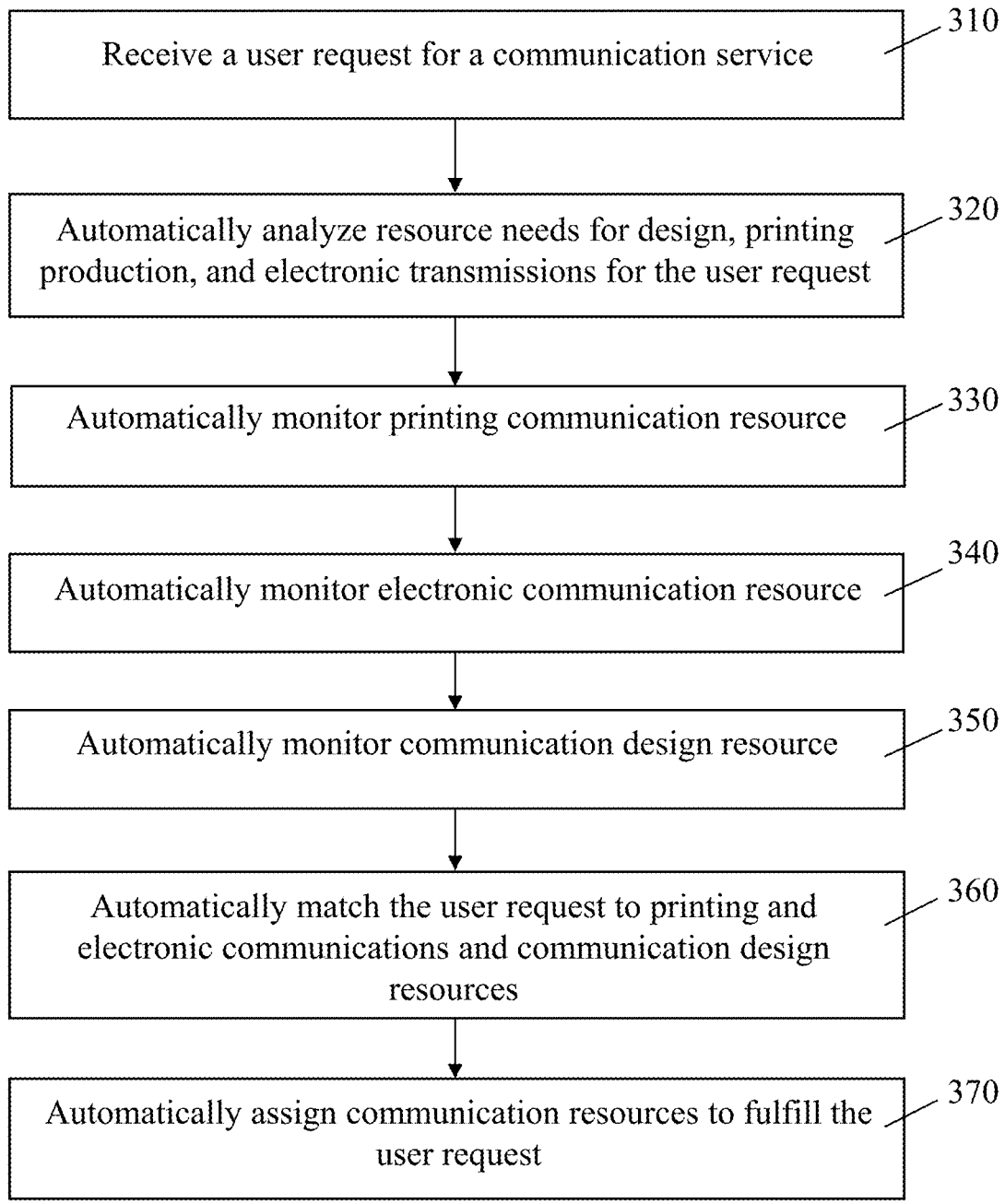
FIG. 3 is a flow diagram for allocating communication resources by the network-based communication fulfillment system in accordance with the present invention.

The allocation of communication resources for a communication request can include one or more of the following steps in the disclosed network-based communication fulfillment system. Referring to FIGS. 1-3, a request for a communication service by a business customer is received (step 310) by a communication resource allocation server.

A user request analysis module automatically analyzes the resource needs for the design, printing production, and electronic transmissions for fulfilling the user request (step 320). The communication request can specify different types of communications such as electronic messages and physical mailing pieces. The printing communication resources in the product fulfillment centers are automatically monitored (step 330) by a printing resource tracking module, which includes the printing and finishing tasks already scheduled to fulfill scheduled communication services. The electronic communication resources are automatically monitored (step 340) by an electronic communication resource tracking module, which includes the electronic transmission tasks already scheduled to fulfill scheduled communication services. The communication design resources are automatically monitored (step 350) by a communication design resource tracking module, which includes the design tasks already scheduled to fulfill scheduled communication services.

Based on the input from the communication request resource matching module, the electronic communication resource tracking module, and the communication design resource tracking module, a communication request resource matching module automatically matches the user requested communication service to print and electronic communication and communication design resources (step 360). A communication resource assignment module then automatically assigns the communication resources to fulfill the user request (step 370).

In some embodiments, the network-based communication fulfillment system 10 includes powerful capabilities to automatically extract, quantify, and normalize information from communication content files in different formats from different sources, organize and store the quantified communication content in a unified database suitable for many communication services, and automatically construct design files based on data stored in the unified database.

Figure 4:
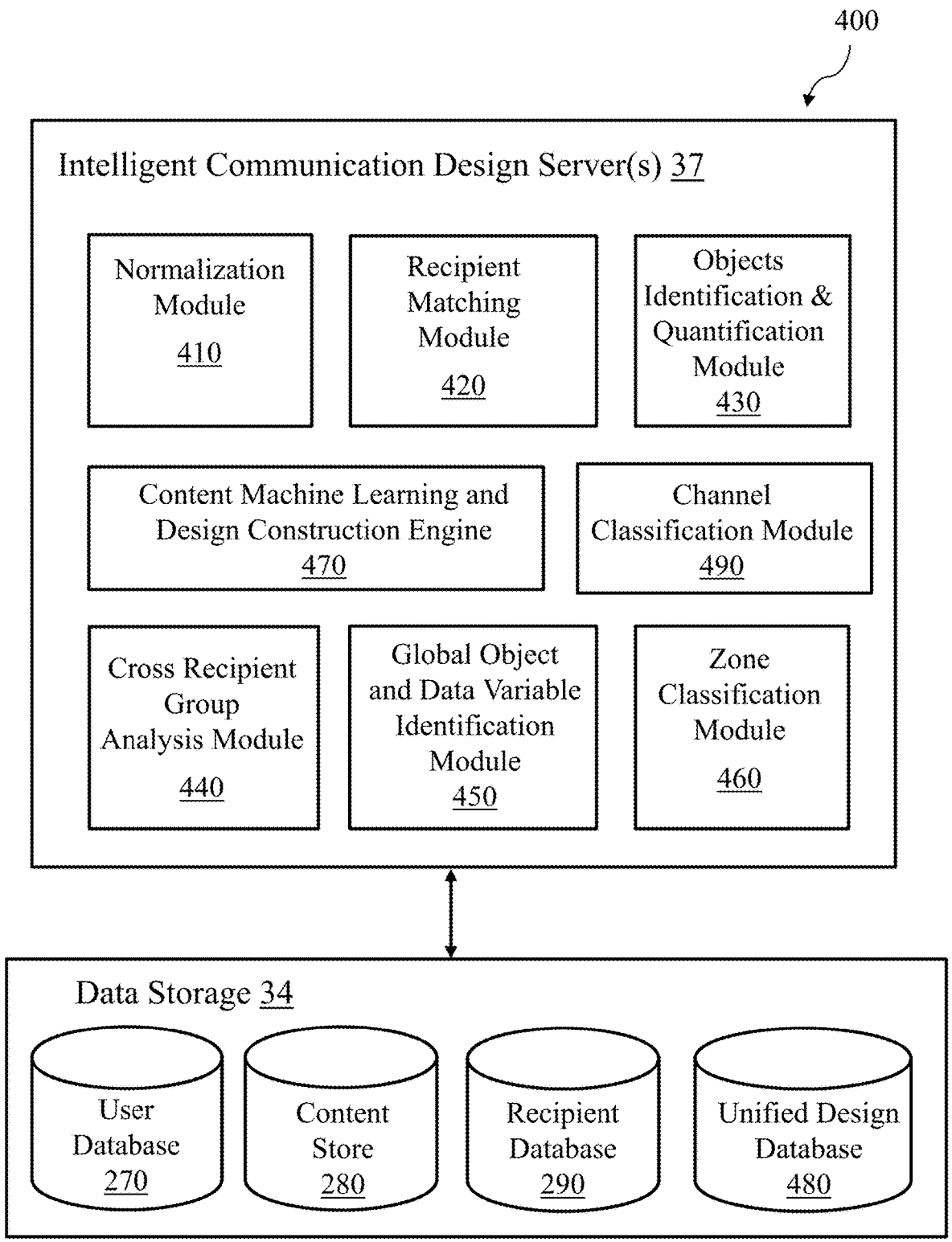
FIG. 4 is a block diagram of an automated communication design analysis and construction system in the network-based communication fulfillment system in FIG. 1.

Referring to FIG. 4, an automated communication design analysis and construction system 400 that includes the one or more intelligent communication design servers 37 include a normalization module 410, a recipient matching module 420, an objects identification and quantification module 430, a cross-recipient group analysis module 440, a global object and data variable identification module 450, and a zone-classification module 460. Moreover, the one or more intelligent communication design servers 37 include a machine learning and design construction engine 470. The automated communication design analysis and construction system 400 also includes the data storage 34 that includes a unified design database 480 in communication with the machine learning and design construction engine 470 and other modules in the one or more intelligent communication design servers 37.

Figure 5:
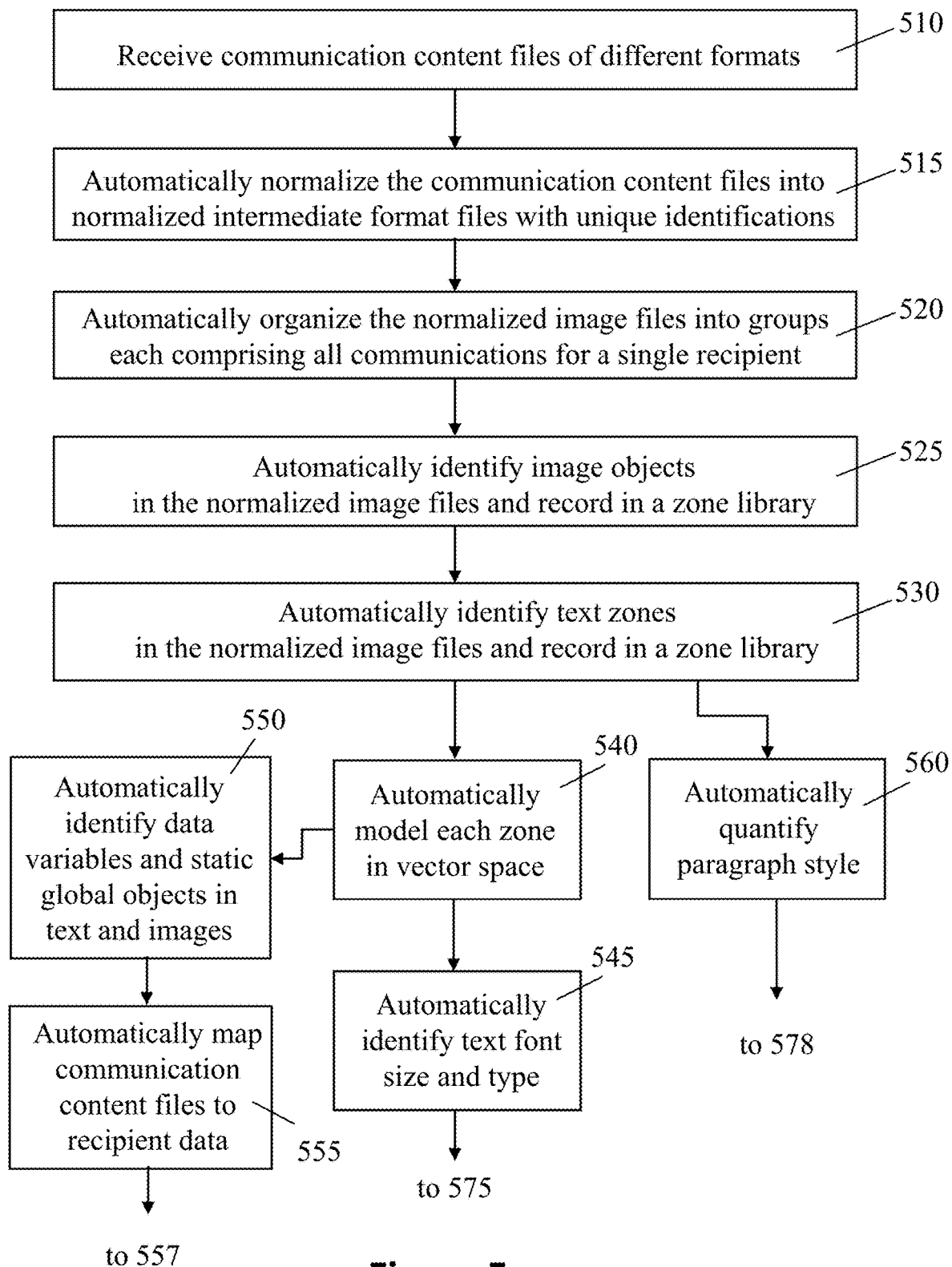
FIG. 5 is a flow diagram for intelligently understanding and constructing communication content in the network-based communication fulfillment system in FIG. 1.
Figure 5:
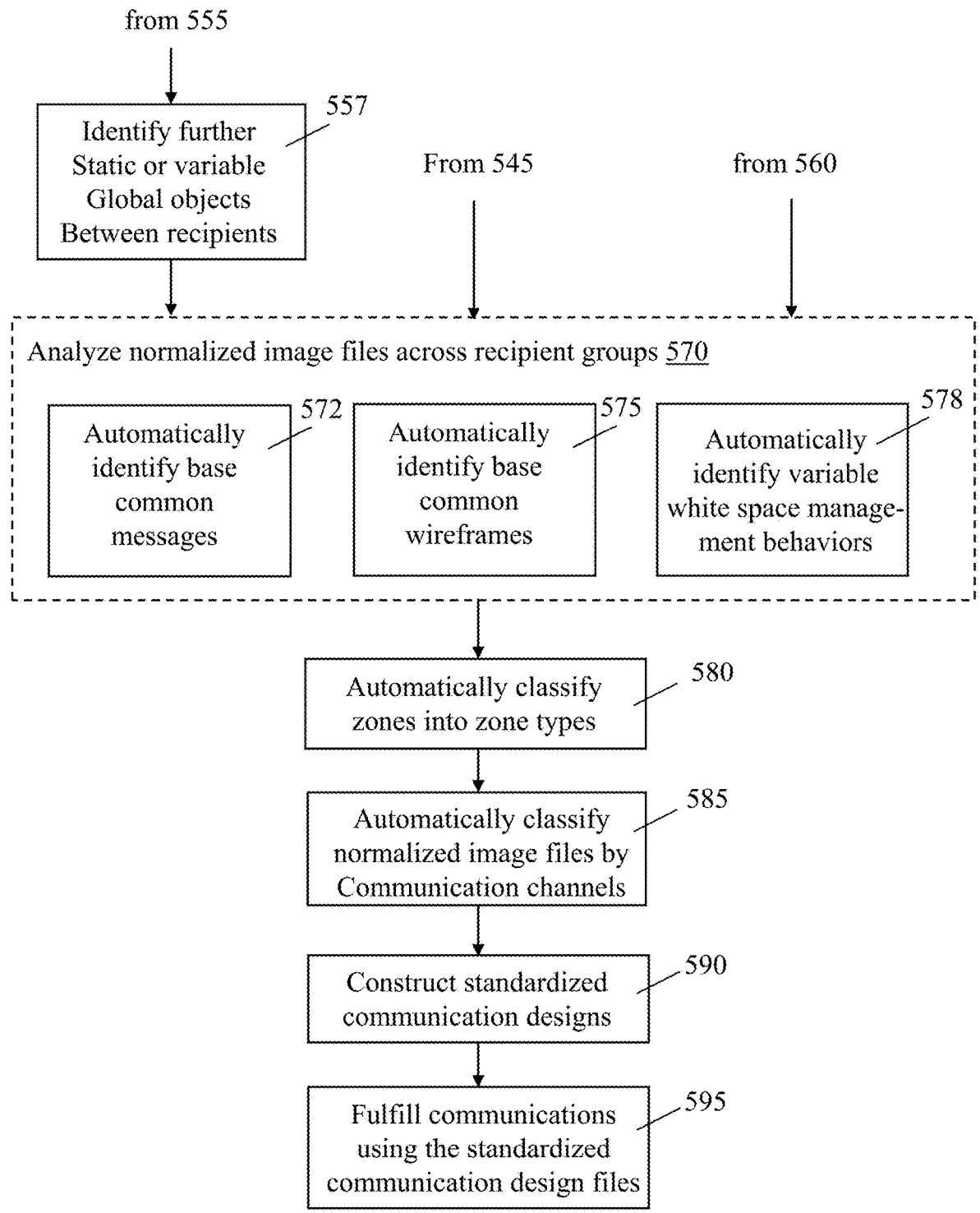

The automatic normalization, quantization, and standard construction of communication contents can include one or more of the following steps in the disclosed network-based communication fulfillment system. Referring to FIGS. 1, 4, and 5, the normalization module 410 receives communication content files in different formats (step 510) from different users. These non-technical business users lead a marketing or communication campaign and are provided materials from a number of different internal or external teams such as art/creative, marketing, legal, governmental regulatory branches, and data sciences, etc. The materials provided to the user by such aforementioned teams may be of varying types and qualities due to different approaches and best practices within these teams and the legacy software tools they use to create the materials. These materials may be generated from a number of disparate technologies and systems that are not well integrated for direct transferal or ingestion into communication production execution. The types of the software tool and thus the types of output files can depend on many factors such as tradition and what's available in the particular firm, familiarity with the tools by the designers, file format of the historic communication design files, etc. Due to the competitive nature of vendors supplying these software tools that users and firms have chosen to leverage, the output from these tools takes many formats, which are distinct and not well integrated with other formats. Examples of different file formats, as shown in FIG. 6 can include data files in a range of formats (e.g. fixed length, delimited, XML, Microsoft Excel, INDD, PDF, WORD, FONT, JPEG, etc.) containing varying recipient information (e.g. geographic, demographic, and/or behavioristic information).

Figure 6:
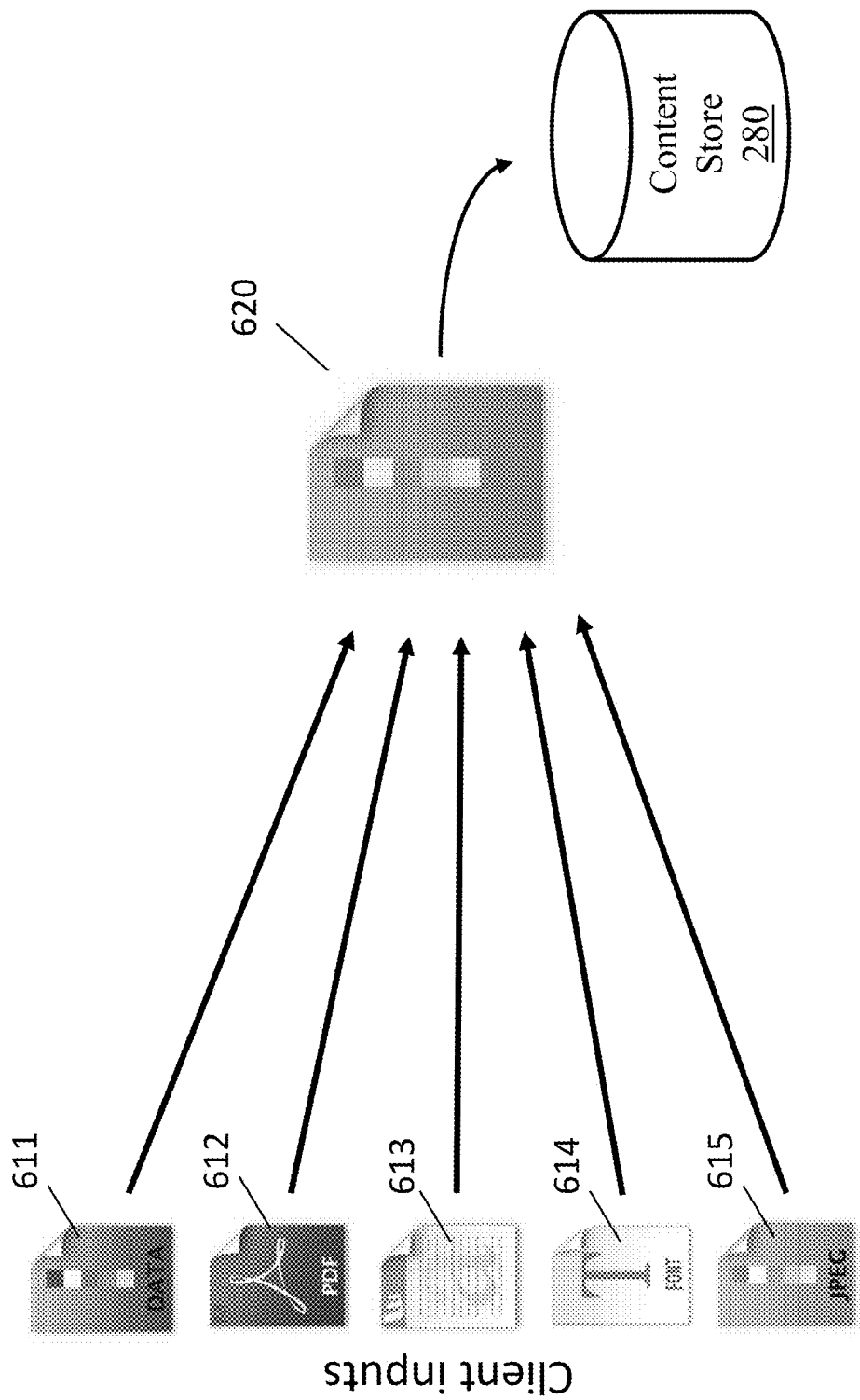
FIG. 6 is a schematic diagram illustrating conversion of communication content files received from clients in different formats into a normalized intermediate format to be index and tokenized as needed.

Referring to FIGS. 4-6, the normalization module 410 automatically normalizes the communication content files 611-615 into normalized intermediate format files (NIFF) 620 with unique identifications (step 515). These NIFFs 620 allow for universal analysis and storage that is agnostic to any specific delivery process or product so that NIFF 620 can eventually be transformed into the required format based on which type of communication channel is deemed necessary for final communication execution. The NIFF 620 are stored in the content store 280.

Business users who manage existing communication campaigns may already have a corpus of existing examples of previously executed communications, but the business rules and logic used to compose the communications are not well curated over time or lost altogether, so when a business user wants to switch vendors or communication channels it becomes difficult for the business user or their vendor to replicate the communication material and business logic. Thus, there is a need to analyze and compare communications from the existing corpus by identifying each unique group of communications for a given recipient.

Figure 7:
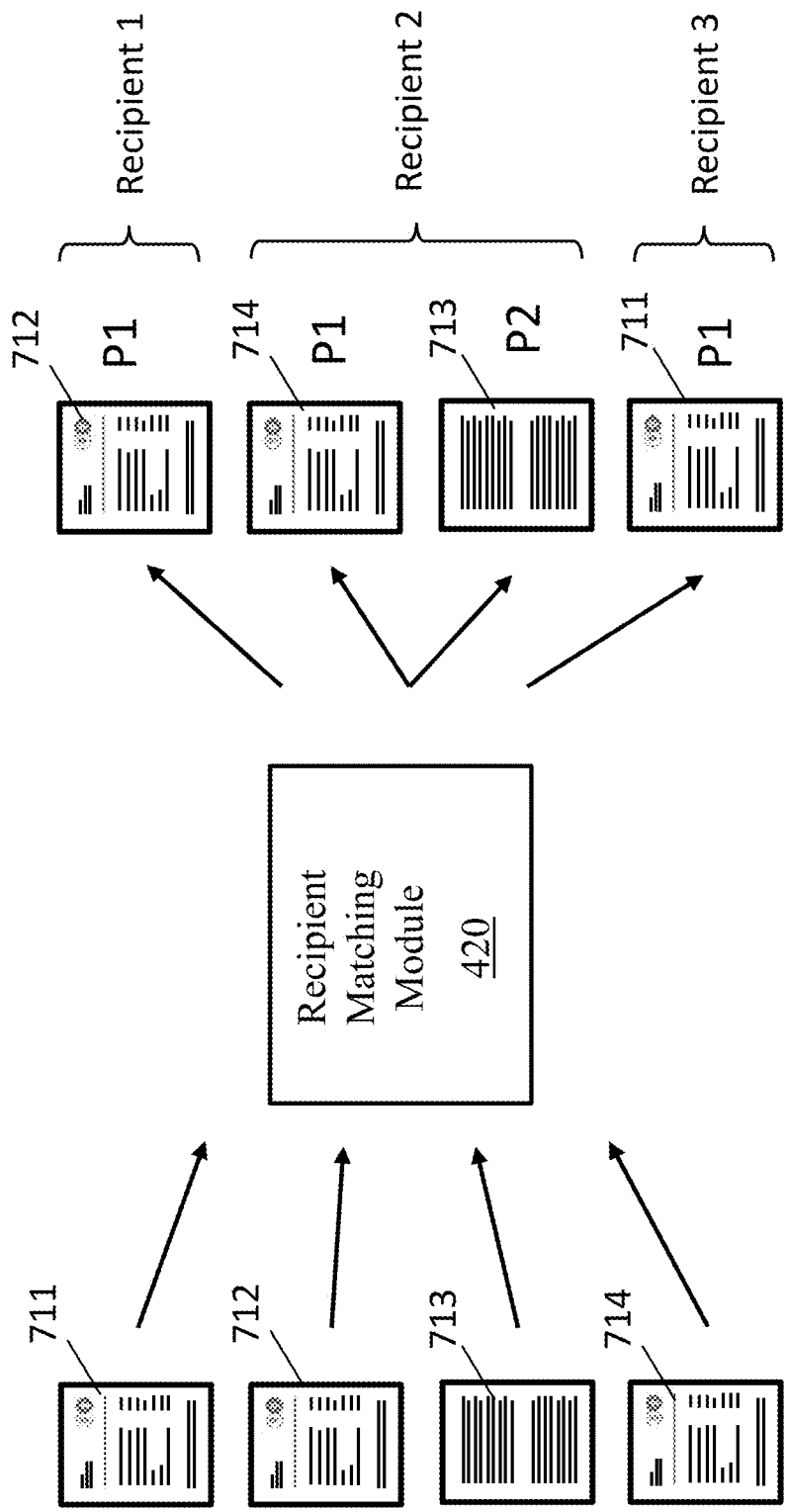
FIG. 7 is a schematic diagram illustrating automatic grouping and indexing of the normalized intermediate format files into groups each representing the sum total of all communication documents for a given recipient.

Referring to FIGS. 4-5, 7, the recipient matching module 420 automatically organizes the normalized intermediate format files into groups each representing all communication documents for a single recipient (step 520) using document classification machine learning. The recipients 1-3 associated with normalized intermediate format files 711-714 are identified. The normalized intermediate format files 711-714 are grouped according to the recipients 1-3. For example, the NIFF 712, 711 are single page communication files respectively associated with recipient 1 and 3. The NIFF files 714, 713 are the first page and the second page of a communication file associated with recipient 2. Now that each group of communications has been identified for further analysis of the communication content, styling, logic, variability, and communication channels used for execution can be compared and analyzed.

Figure 8:
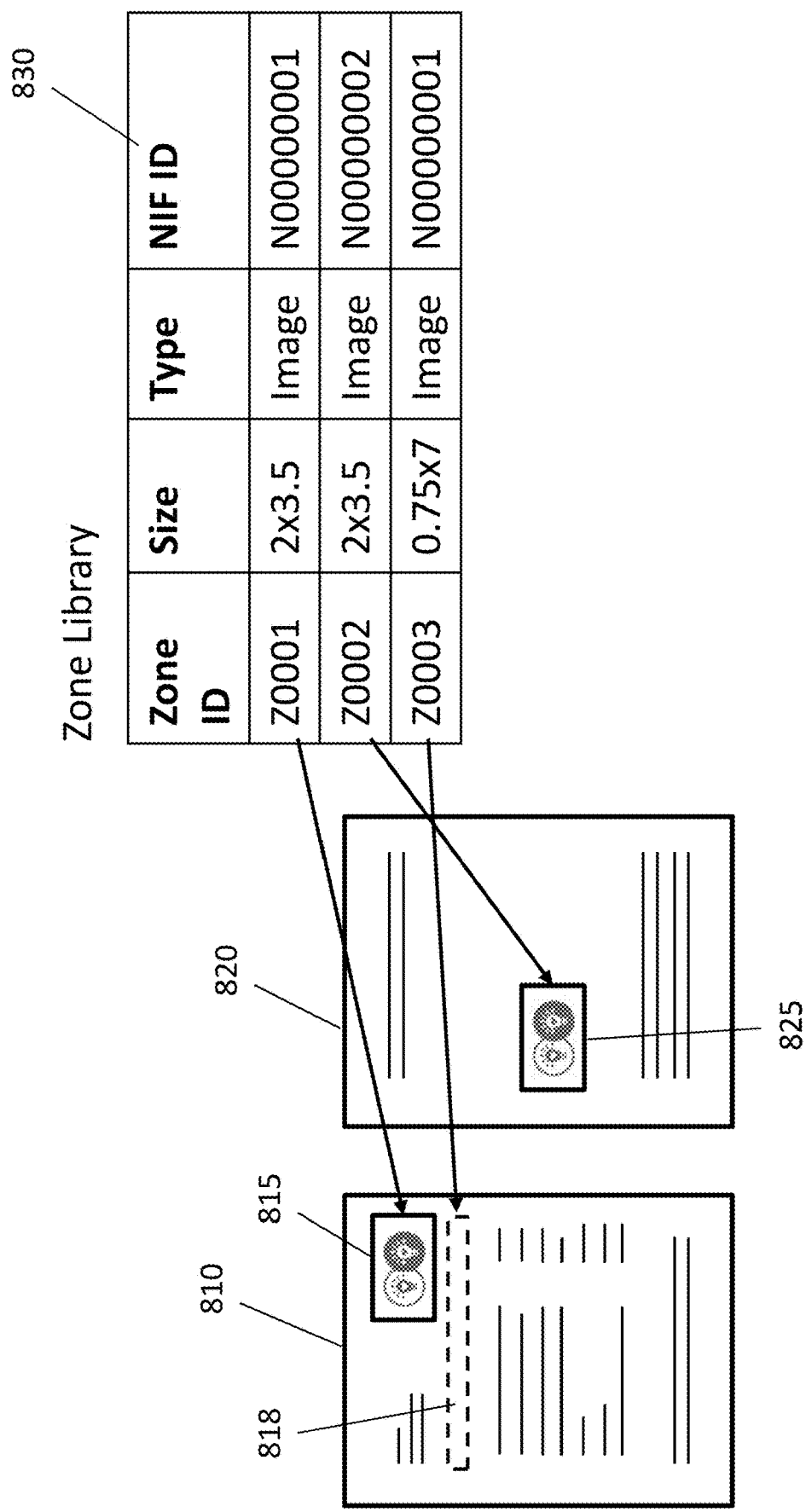
FIG. 8 is a schematic diagram illustrating automatic identification and indexing of image objects in the normalized intermediate format files.

Referring to FIGS. 4-5, 8, the objects identification and quantification module 430 automatically identify image objects 815, 818, 825 and their location in the NIFF 810, 820 and record in a zone library 830 (step 525) using image recognition machine learning such as the Stroke Width Transform (SWT) algorithm. For example, image objects 815, 825, 818 are identified and stored respectively in zones 1-3 in the zone library 830. Each object is defined by its properties such as size, type, and other uniquely identifiable digital features.

Figure 9:
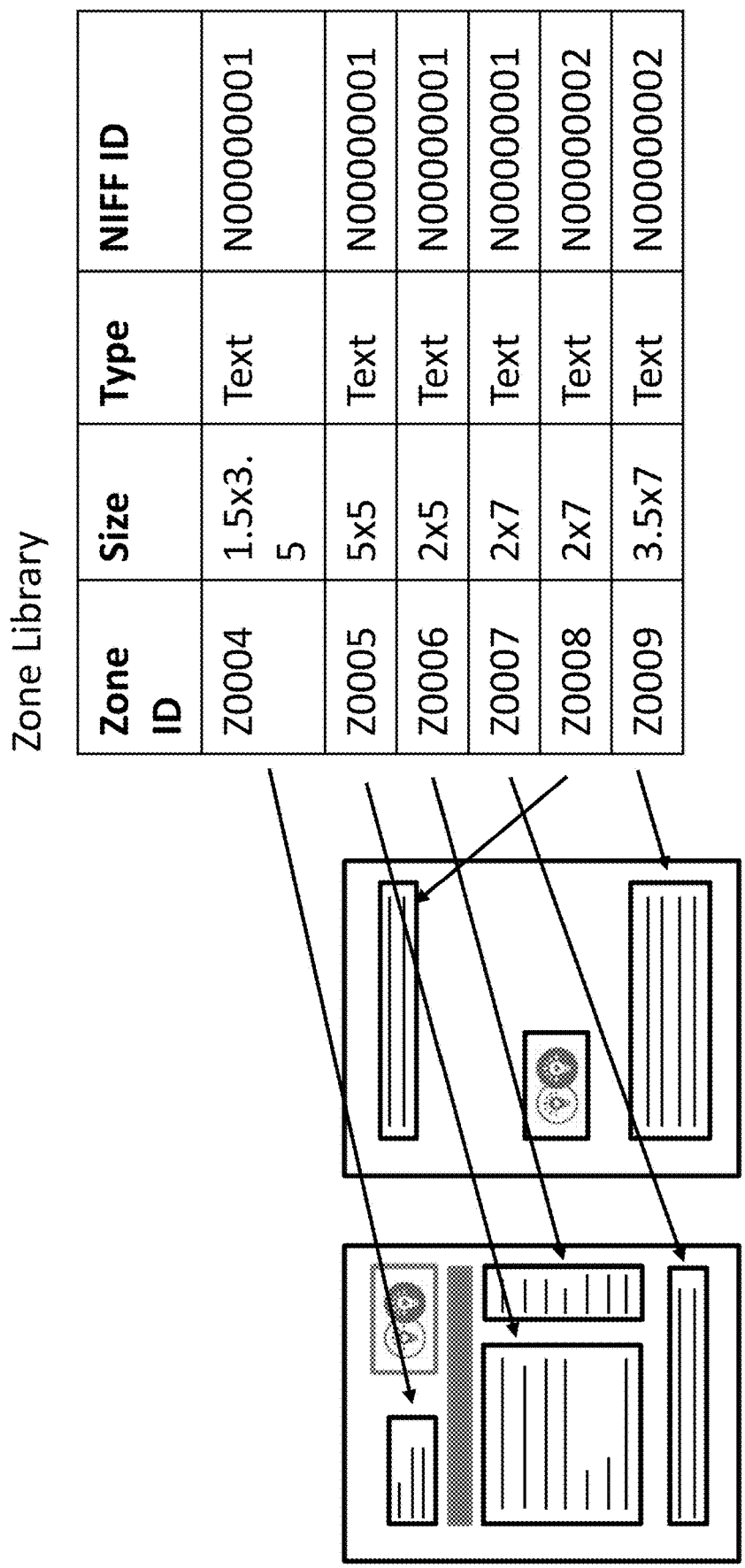
FIG. 9 is a schematic diagram illustrating automatic identification and indexing of text zone types and wireframes in the normalized intermediate format files.

Referring to FIGS. 4-5, 9, the objects identification and quantification module 430 automatically identify text zones and their location from the remaining content not identified as an image using image recognition and classification machine learning. This results in the outlining of the wireframes in each of the NIFF, which are then indexed and recorded in the zone library (480 in FIG. 4) (step 530).

Figure 10A:
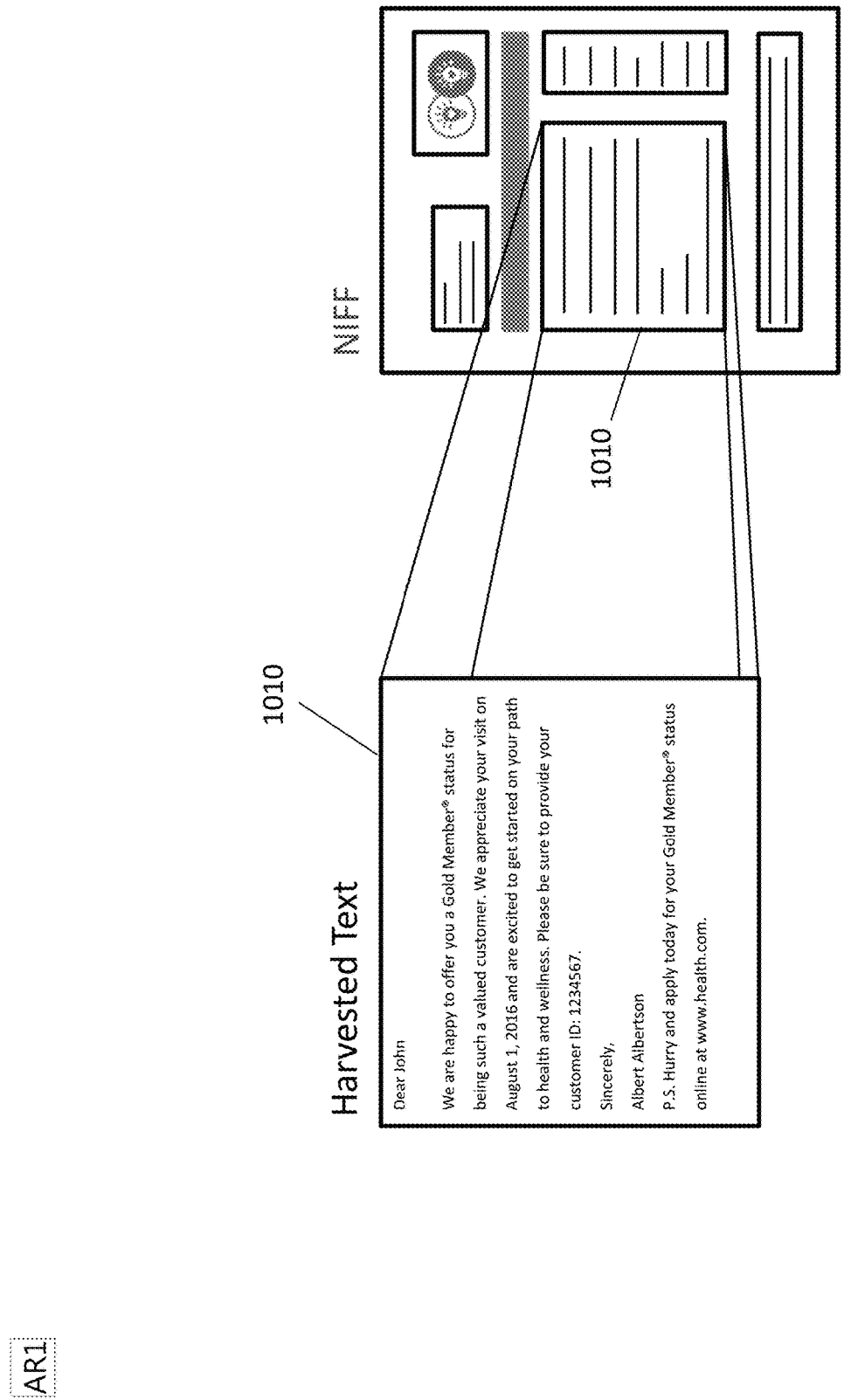
FIG. 10A is a schematic diagram illustrating modeling each zone in vector space.
Figure 10B:
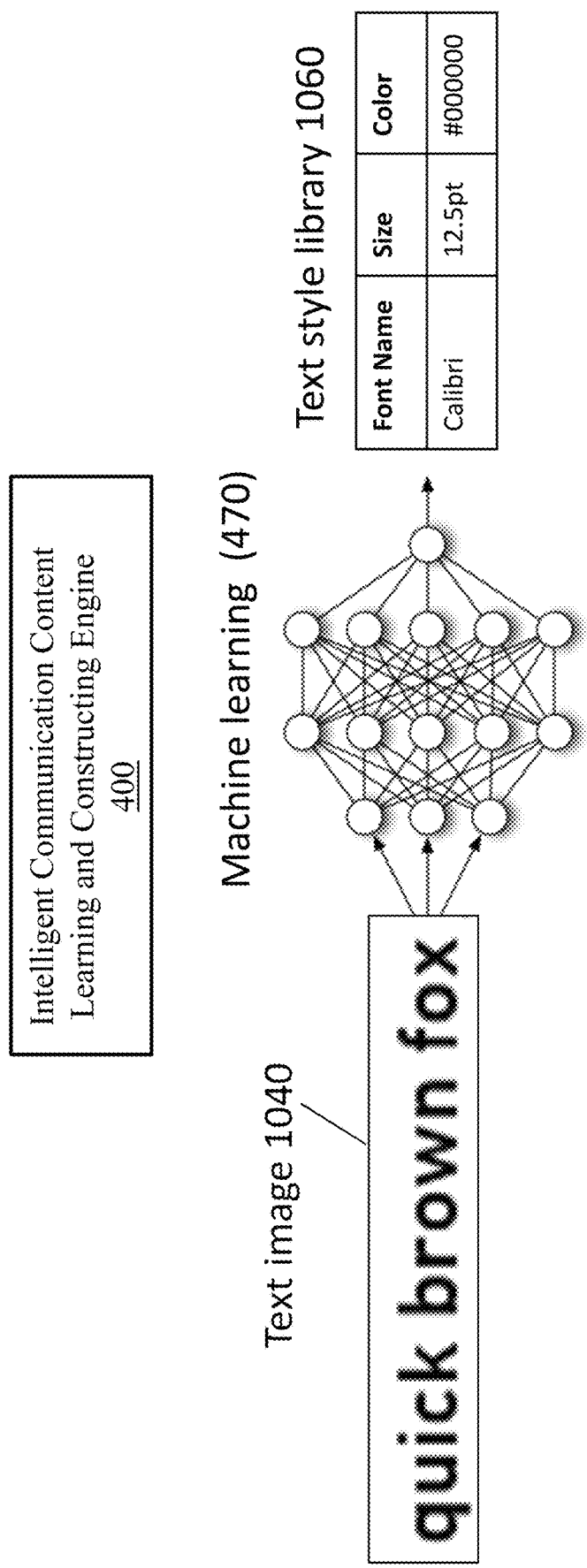
FIG. 10B is a schematic diagram illustrating automatic identifications of font sizes and types in the text objects.

Referring to FIGS. 4-5, 10A, the machine learning and design construction engine 470 automatically models each zone in vector space (step 540). For example, the text zone 1010 is selected and the text detected within the zone will undergo normalization process of tokening, converting words to all lower-case characters, removing stop-words (i.e. insignificant words), stemming, and then finally assigning values to the remaining words via Term Frequency-Inverse Document Frequency (TF-IDF). In the vectorized space within each zone, referring to FIGS. 4-5, 10B, the machine learning and design construction engine 470 automatically identifies text font size and type using font recognition machine learning using artificial neural networks and records it in the text style library (step 545). A text image 1040, which has been recognized and stored in the zone library in step 530 and has been vectorized in step 540, is analyzed by the machine learning and design construction engine 470. Font type, size, and color are identified using convolutional artificial neural networks that were trained using a data set of already existing fonts within a range of sizes and colors. The convolutional artificial neural network will then be able to identify any font type from the training set within new text samples and will also be able to infer the additional colors and font sizes of new text sample based on the extrapolation of what was learned in the range of the colors and sizes in the training data set. The recognized font type name, font size, and font color are stored in a text style library 1060 (which can be stored in the unified design database shown 480 in FIG. 4).

Figure 11:
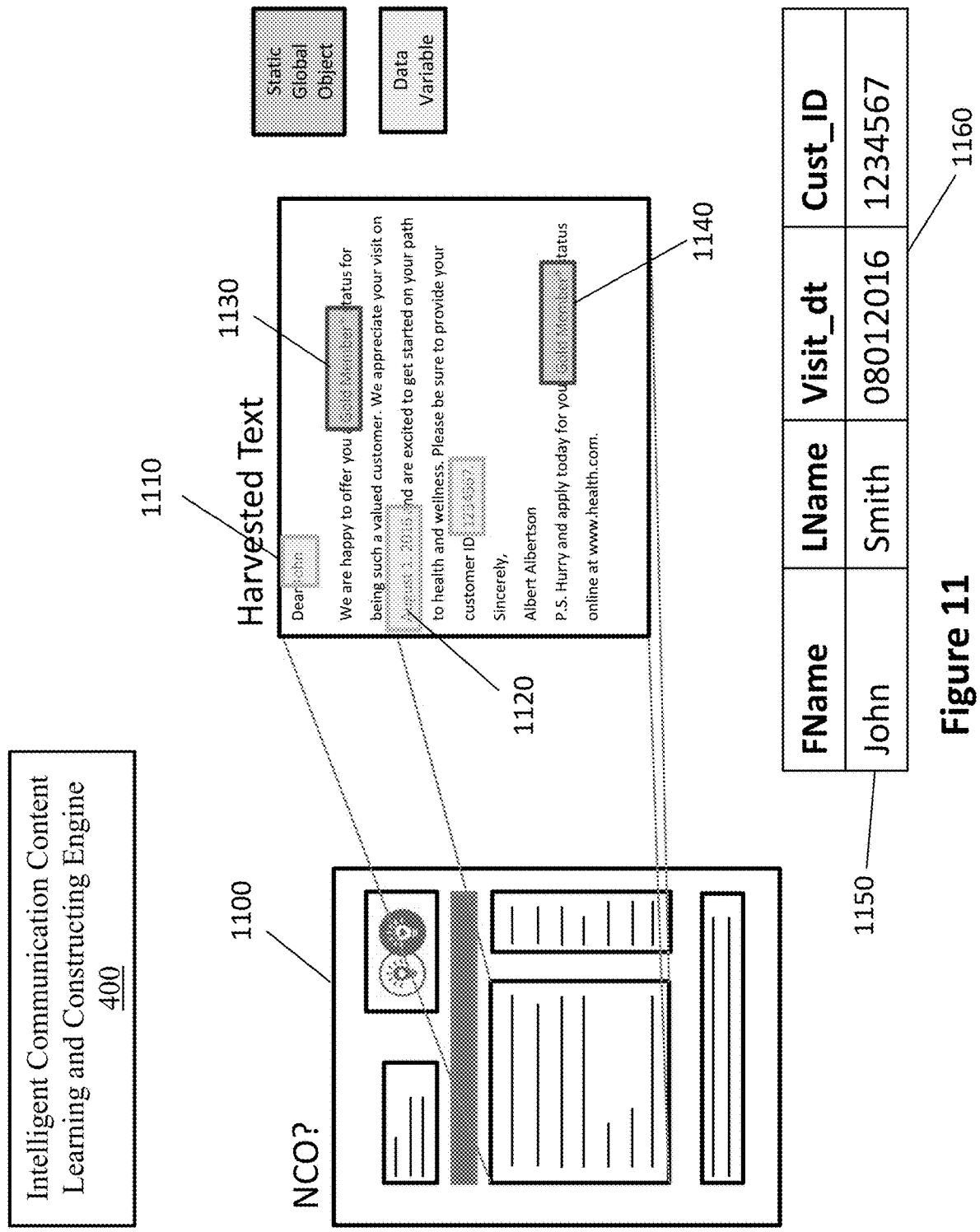
FIG. 11 is a schematic diagram illustrating automatic identification of data variables and static global objects.

After the image and text objects are respectively recognized and stored in the zone library in steps 525, 530 and are respectively vectorized in step 540, referring to FIGS. 4-5, 11, the global object and data variable identification module 450 automatically identifies data variables and static global objects in text zones and image objects (step 550). A global object is an image or text string (se FIG. 11, 1130) that may be reused within a single zone (see FIG. 11, 1140), across multiple different zones within a single wireframe, and/or across zones of multiple different wireframes and communication channels. Data variables are a text string that originates from a data file (see FIGS. 11, 1150 and 1160) (e.g. XML, DAT, CSV, XLSX, etc.) and is placed into content on a communication output (see FIGS. 11, 1110, and 1120). Using Vector Space Modeling (VSM) machine learning model previously defined in step 540, we can use the data values within the supplied data files to perform a nearest-neighbor comparison to match text within the VSM to the text in the data file to identify data variables with a 100% match or a match within a defined similarity tolerance. To identify global text objects the VSM defined in step 540 can be used to perform another nearest-neighbor comparison between text strings within a single zone of a single NIFF with a 100% match.

Figure 12:
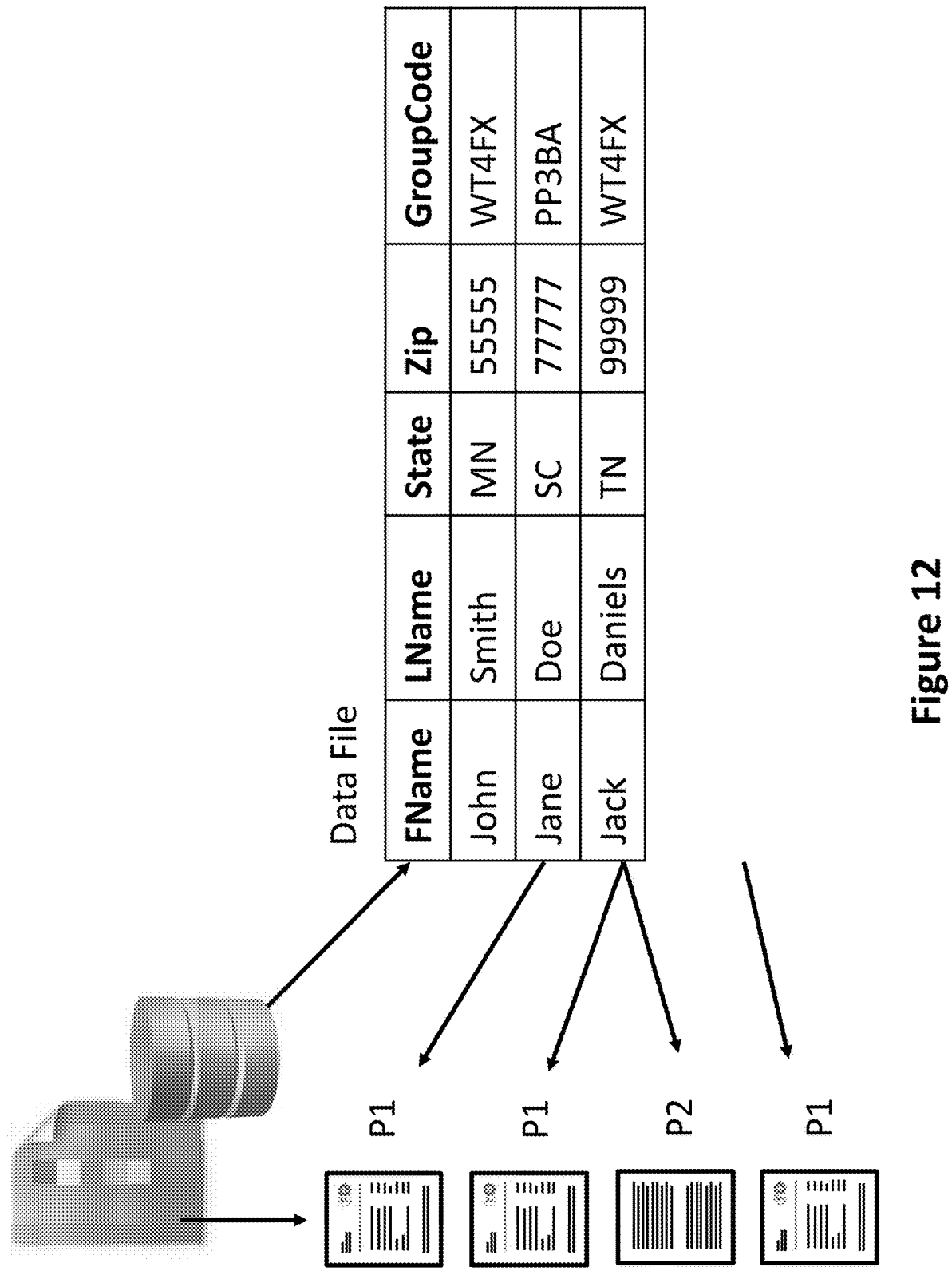
FIG. 12 is schematic diagram illustrating automatic matching of entire groups of communication documents to each recipient in the accompanying data file.
Figure 13A:
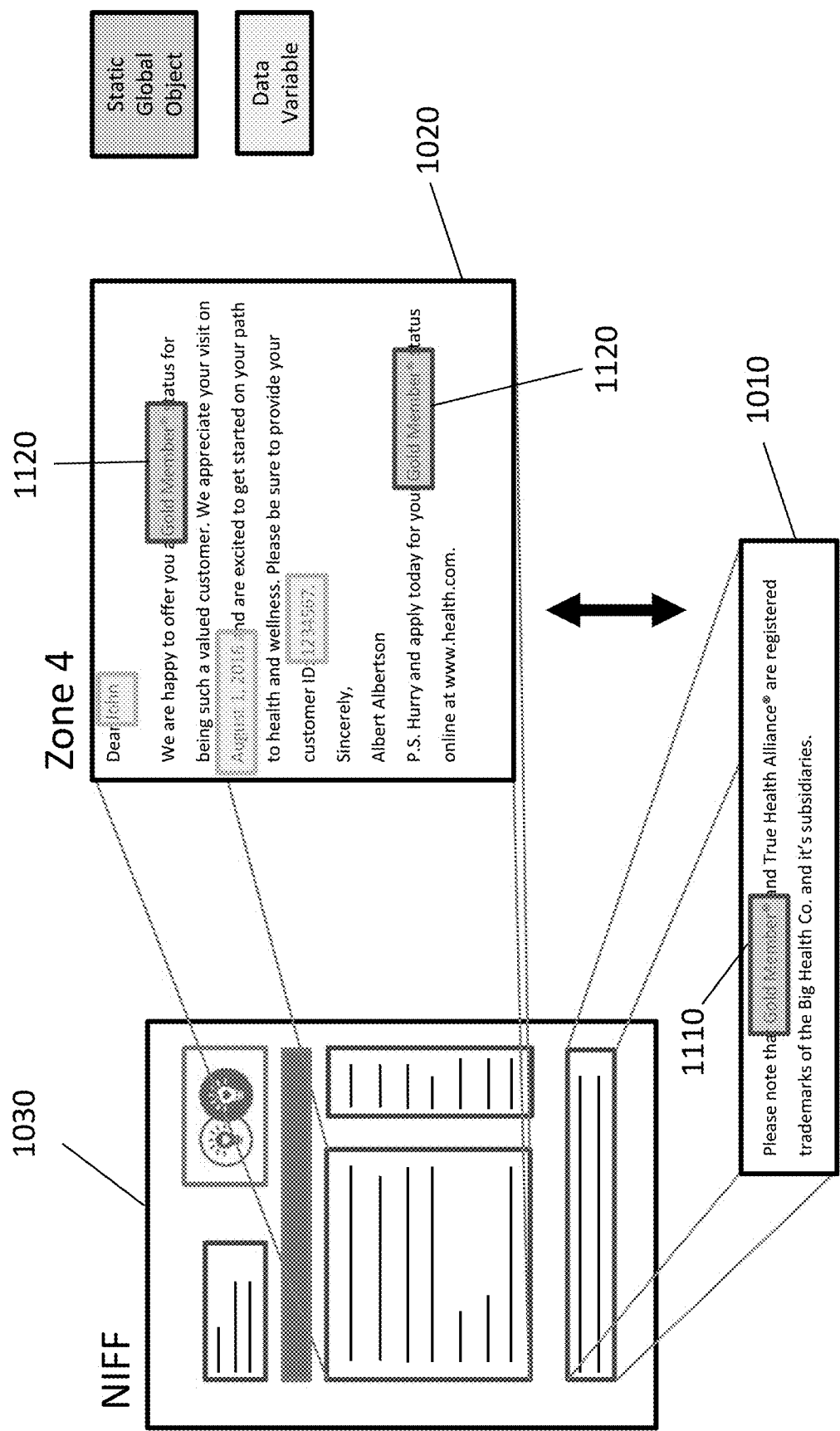
FIGS. 13A and 13B are a schematic diagram illustrating the automatic identification and indexing of additional static global objects found between zones within the same normalized intermediate format file.
Figure 13B:
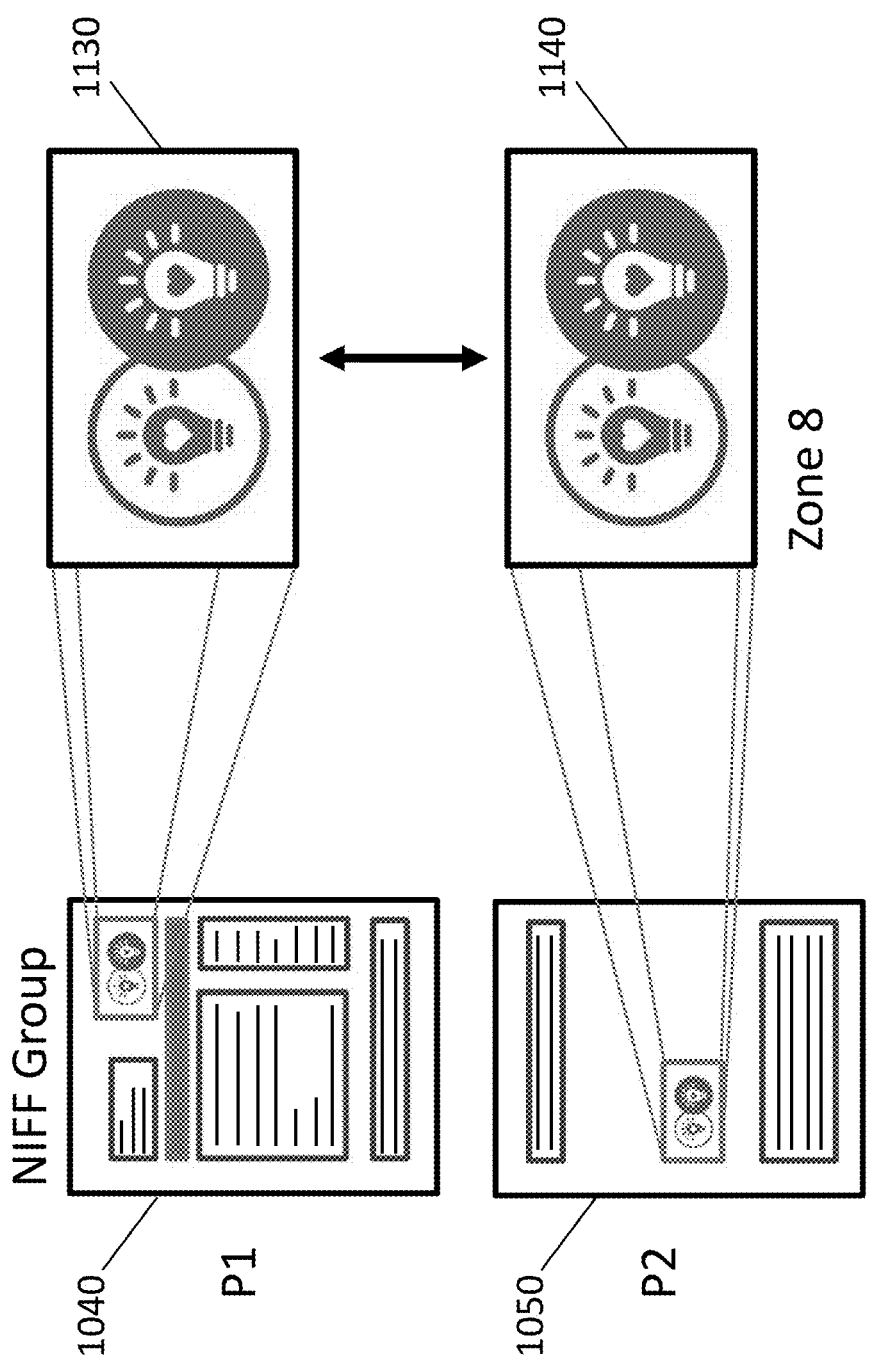

Referring to FIGS. 4-5, 12, the recipient matching module 420 automatically map communication content files to recipient data (step 555) by leveraging the results of the Recipient Matching Model (step 520) in FIG. 7. In step 520 illustrated in FIG. 7, the pages in the communication were grouped together based on clustering machine learning without identifying a recipient for a group of pages. In step 555 shown here in FIG. 12, recipients are identified for each group of pages of the communication.

Referring to FIGS. 4-5, 13A, 13B, the content machine learning and design construction engine 470 automatically analyzes different zones (FIGS. 13A, 1010 and 1020) within the same normalized intermediate format file to further identify static global objects (FIGS. 13A, 1100 and 1120) for a single recipient (step 557) using Vector Space Modeling machine learning from step 540, that could not have been identified previously since previous comparisons were only within a single zone. Additionally, the content machine learning and design construction engine 470 automatically analyzes different zones between different normalized intermediate format files (FIGS. 13B, 1040 and 1050) grouped and associated with a recipient in step 555 to further identify static global objects (FIGS. 13B, 1130 and 1140) for a single recipient (step 557) using Vector Space Modeling machine learning from step 540.

In some embodiments, the data storage 34 (FIG. 4) stores a unified file structure defines the static global objects, the data variables, and the variable global objects in the normalized intermediate format files for communications to different recipients. These communications can be delivered in different channels such as physical prints, email, or in a web form.

Figure 14:
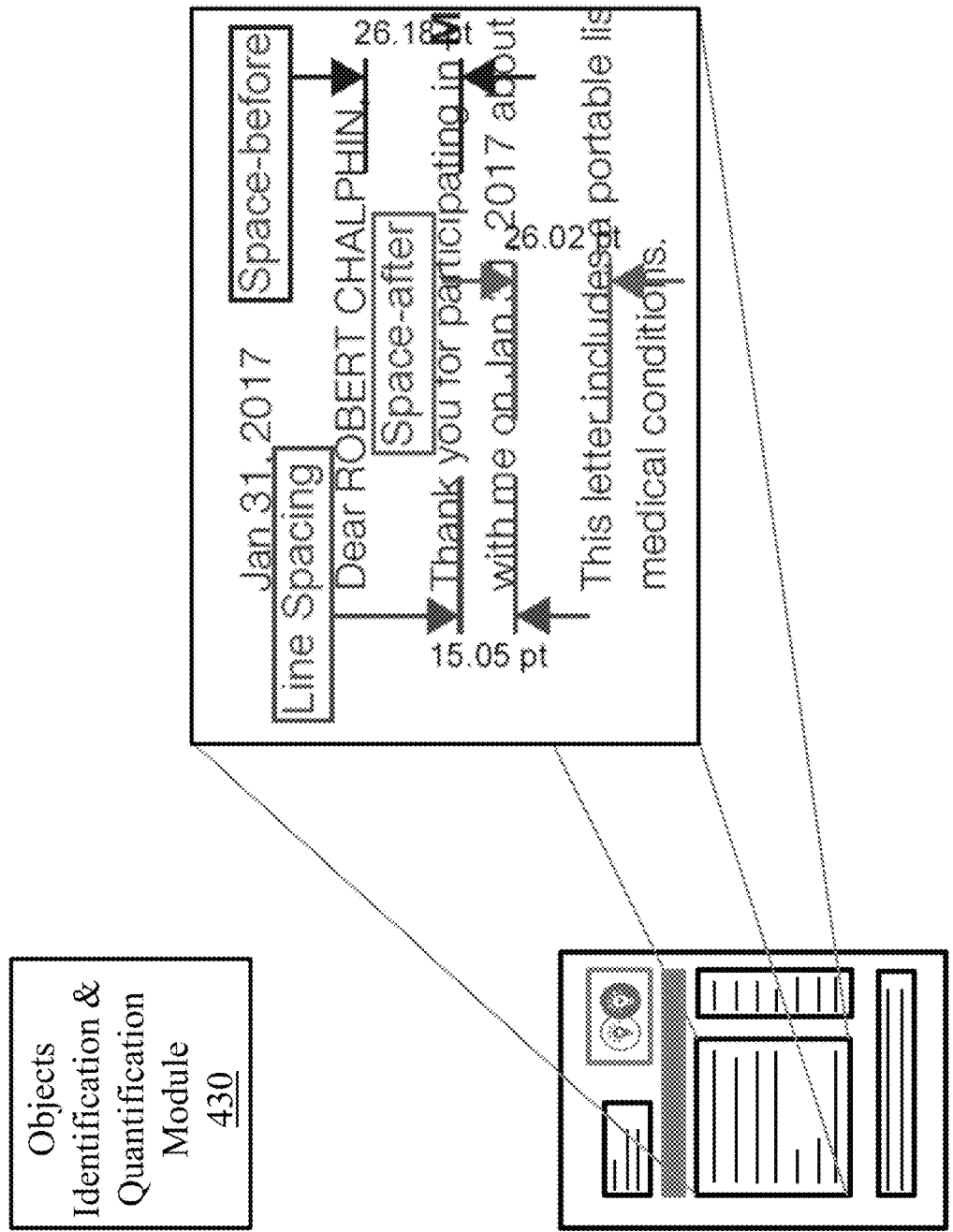
FIG. 14 is a schematic diagram illustrating automatic quantification of paragraph styles within and between the text objects.

Referring to FIGS. 4-5, 14, the machine learning and design construction engine 470 automatically quantifies paragraph style (step 560). Text Line Localization (TLL) machine learning is used to identify lines of text and the distances between them, indentations, justifications, distances between and within paragraphs, etc. The paragraph styles can be stored in the unified design database shown 480 in FIG. 4). In some embodiments, the unified file structure stored in the data storage 34 (FIG. 4) defines the zones, wireframes, page behaviors, and paragraph styles in the normalized intermediate format files for communications to different recipients. The unified file structure can also define zones, zone types, and content to be inserted in white space (described below) on pages of the communications.

Figure 15A:
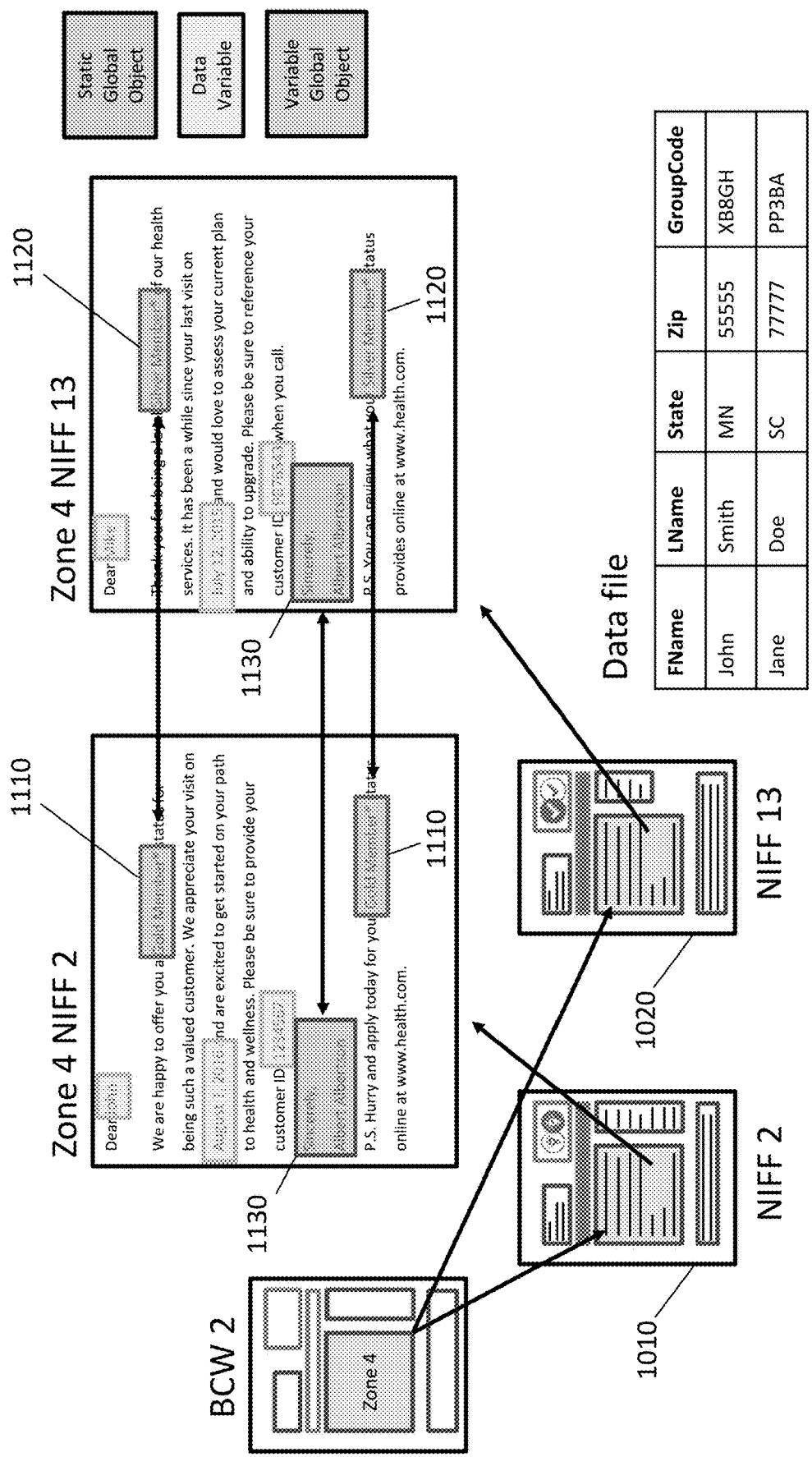
FIGS. 15A and 15B are schematic diagrams illustrating automatic identifications of variable global objects in addition to static global objects and data variables in the normalized intermediate format files corresponding to different recipients.
Figure 15B:
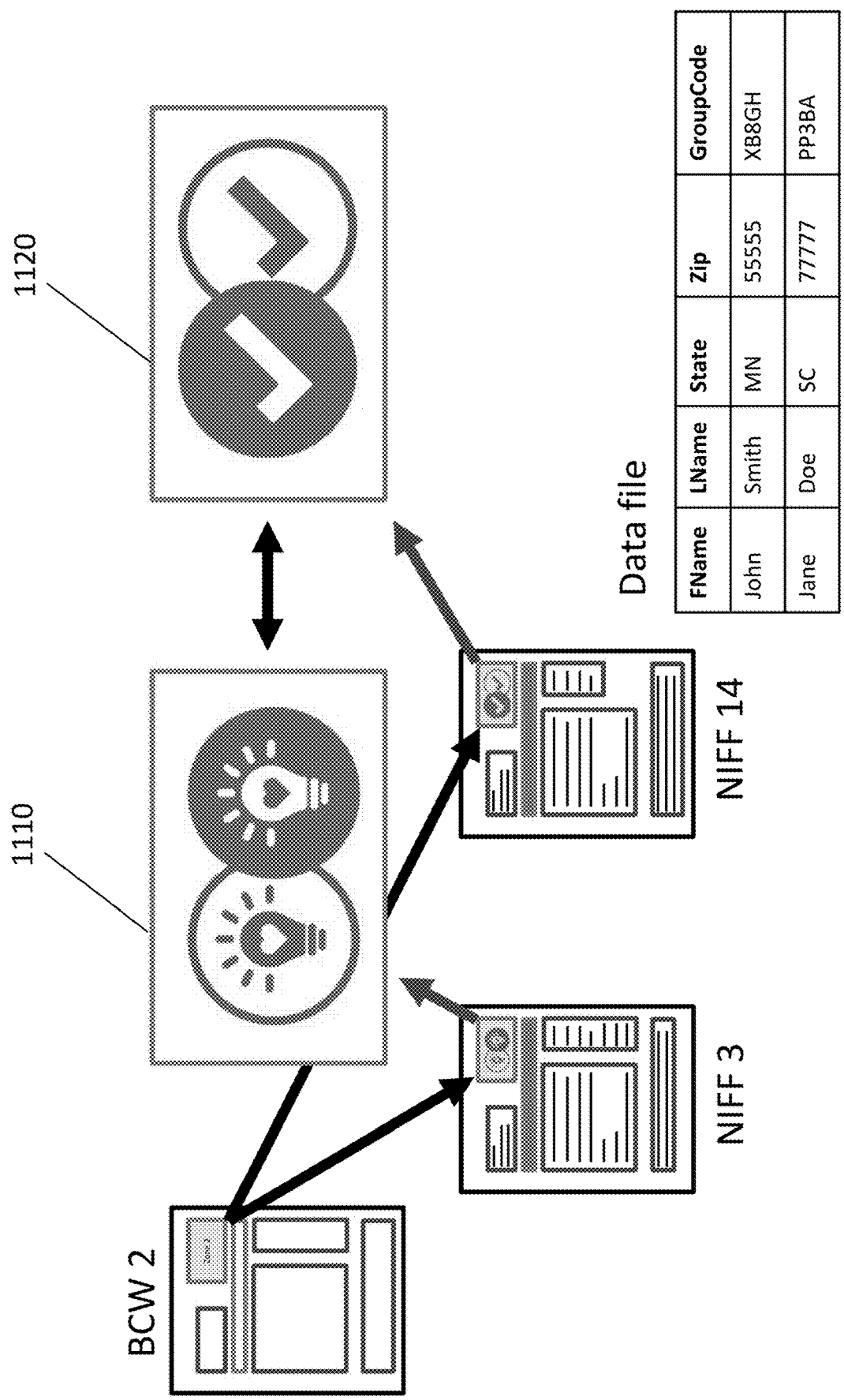

Referring to FIGS. 4-5, 15, the cross-recipient group analysis module 440 automatically analyzes NIFF across-recipient groups (step 570). The global object and data variable identification module 450 automatically identifies static global objects, data variables and now variable global objects, as shown in FIGS. 15A and 15B. By analyzing previously identified static global objects (FIG. 11 step 550 and FIGS. 13A and 13B step 557), variable global objects (FIGS. 15A and 15B, 1110 and 1120) can be identified through comparison in Vector Space Modeling (VSM) machine learning model previously defined in step 540, as well as similar location within similar zones between similar normalized intermediate format files of different recipients (FIGS. 15A, 1010 and 1020). If an accompanying data file was supplied, the system can automatically look at the various data values (e.g. GroupCode) and identify possible values that drive the selection of the variable global objects. Lastly, whereas static global objects were previously only identified for a single recipient (FIG. 11 step 550 and FIGS. 13A and 13B step 557) further static global objects (FIGS. 15A, 1130) can now be identified between different recipients (FIGS. 15A, 1010 and 1020).

Figure 16:
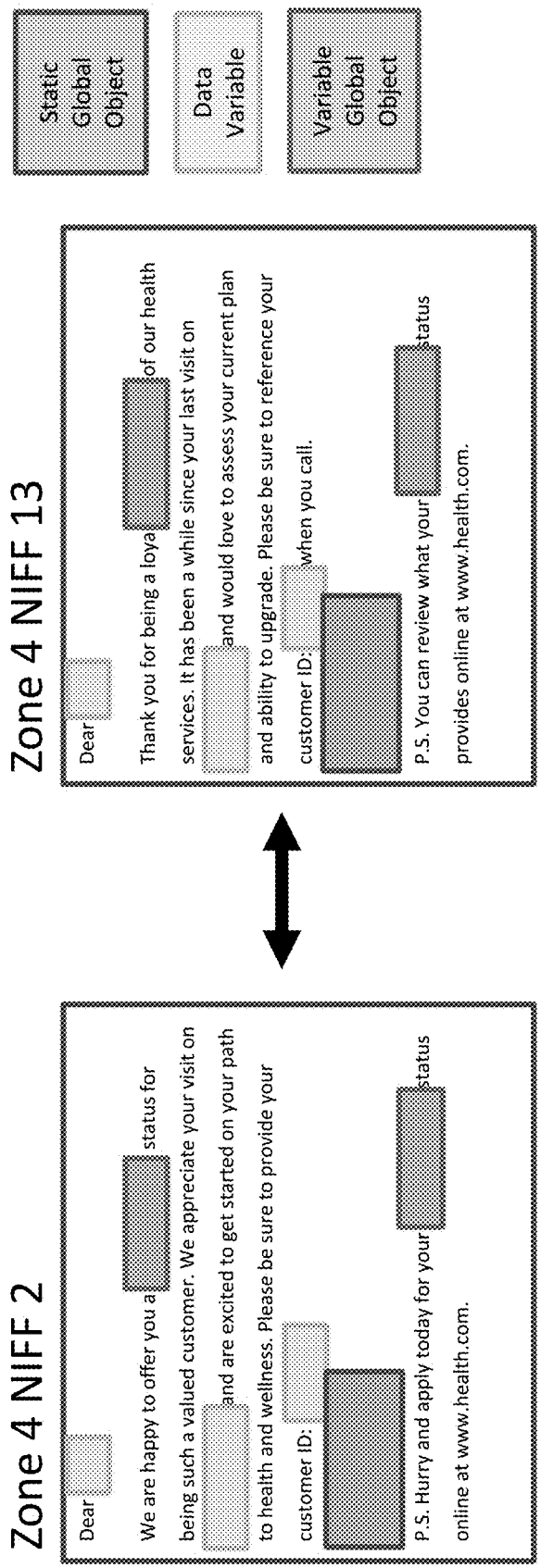
FIG. 16 is a schematic diagram illustrating automatic identifications of base common messages across-recipient groups in the normalized intermediate format files corresponding to different recipients.

Referring to FIGS. 4-5, 16, the cross-recipient group analysis module 440 automatically identifies base common messages (step 572) by suppressing all previously identified data variables as well as static and global objects to analyze the remaining content for uniqueness and recording the results.

Figure 17:
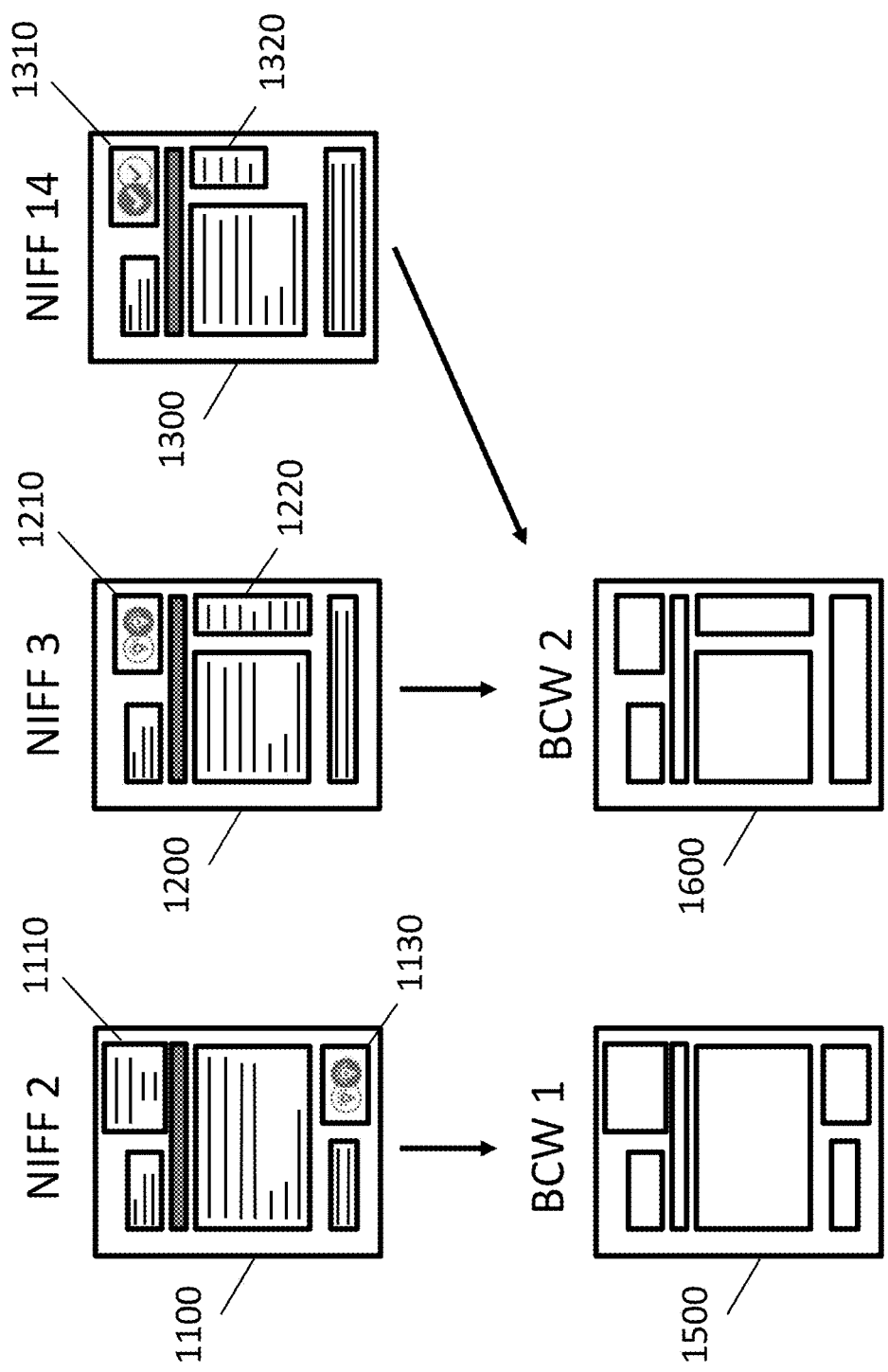
FIG. 17 is a schematic diagram illustrating automatic identifications of base common wireframes in the normalized intermediate format files corresponding to different recipients.

Referring to FIGS. 4-5, 17, the cross-recipient group analysis module 440 automatically identifies base common wireframes using Vector Space Modeling (VSM) machine learning (step 575) by analyzing the locations of the identified image zones (FIG. 8 in step 525) and the identified text zone (FIG. 9 step 530) as a composite Base Common Wireframe (BCM) for each uniquely identified normalized intermediate file format. For example, NIFF 2 (1100) is different from NIFF 3 and NIFF 14 (1200 and 1300) because while all 3 NIFFs have a zone in the top right (1110 and 1210 and 1310) the zone in NIFF 2 (1110) is a text zone whereas the zones in NIFF 3 (1210) and NIFF 14 (1310) are images. In addition, NIFF 2 does not have sidebar content that NIFF 3 and NIFF 14 have (1220 and 1320), but it does have an additional image zone at the bottom (1140) that the other NIFFs do not have, so ultimately it is determined to be a unique BCW 1 (1500) from the other two (1600). As for NIFF 3 and NIFF 14 (1210 and 1310), they only have slight differences but maintain the overall structure. While the image for NIFF 3 (1210) and NIFF 4 (1310) as well as the side bar content (1220 and 1320) are different in content and length, both NIFFs can be generalized into the same BCW 2 (1600) which is still distinct from the other BCW 1 (1500).

Figure 18:
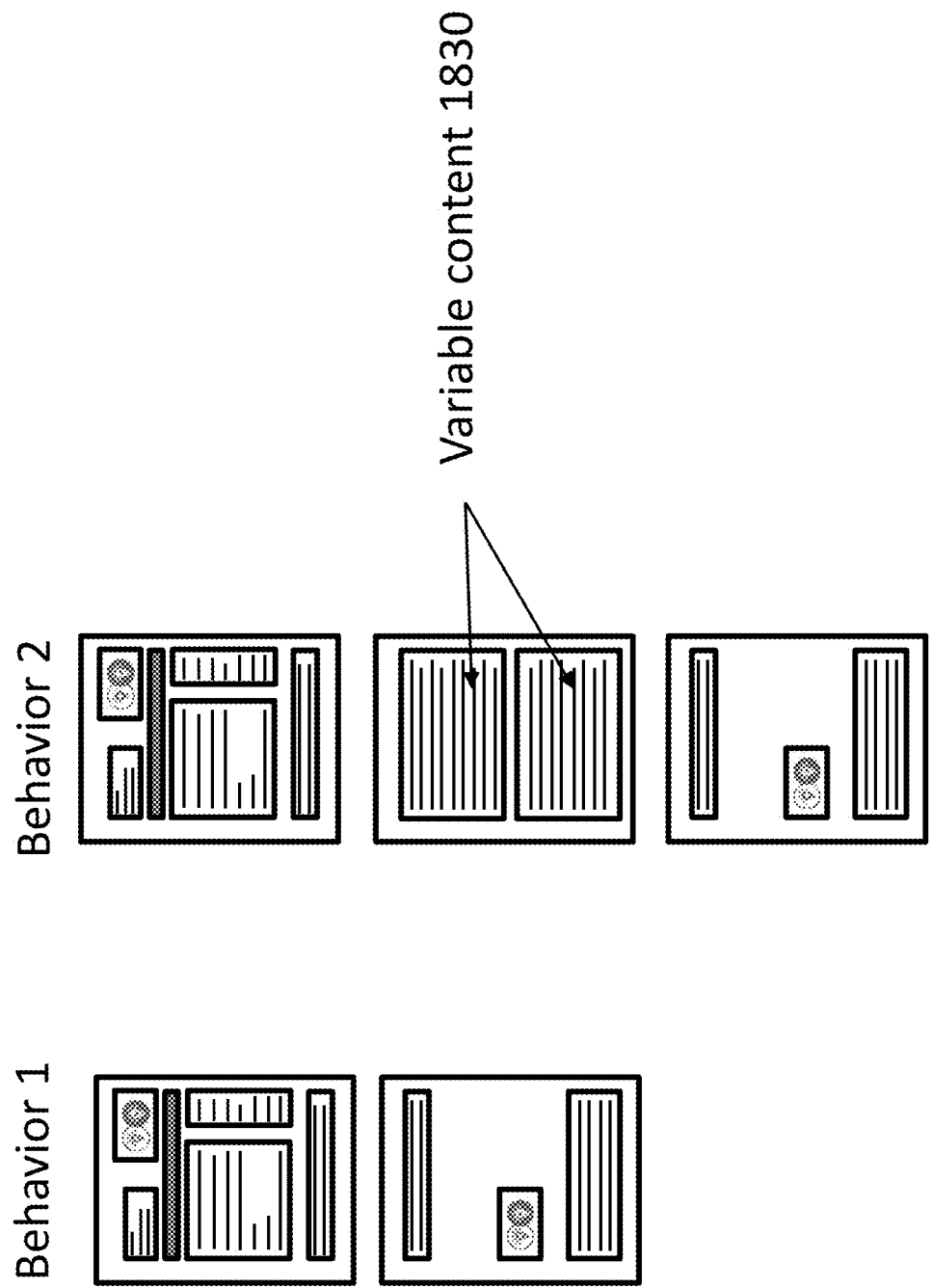
FIG. 18 is a schematic diagram illustrating automatic identifications of variable white space behaviors in the normalized intermediate format file corresponding to different recipients where pages may be inserted into or appended to a communication.

Referring to FIGS. 4-5, 18 and 19, the cross-recipient group analysis module 440 automatically identifies variable white space management behaviors using multi-class classification machine learning (step 578). Referring to FIG. 18, depending on various recipient data (e.g. current enrolled products/medical plans, preferences, demographic information, etc.) a given recipient might receive additional communication material targeted specifically to them such as a specific medical disclaimer based on their unique health plan or perhaps a specific product warranty based on the product they have shown interest in that another recipient may not receive. Variable information 1830 may be inserted or appended into a communication as an entire sheet or section. In some situations, referring to FIG. 19, additional content 1930 can be populated based on a list of qualifying offers or received products that can be repeated or are inserted in small chunks causing other zones to break and flow over to multiple pages.

Figure 20:
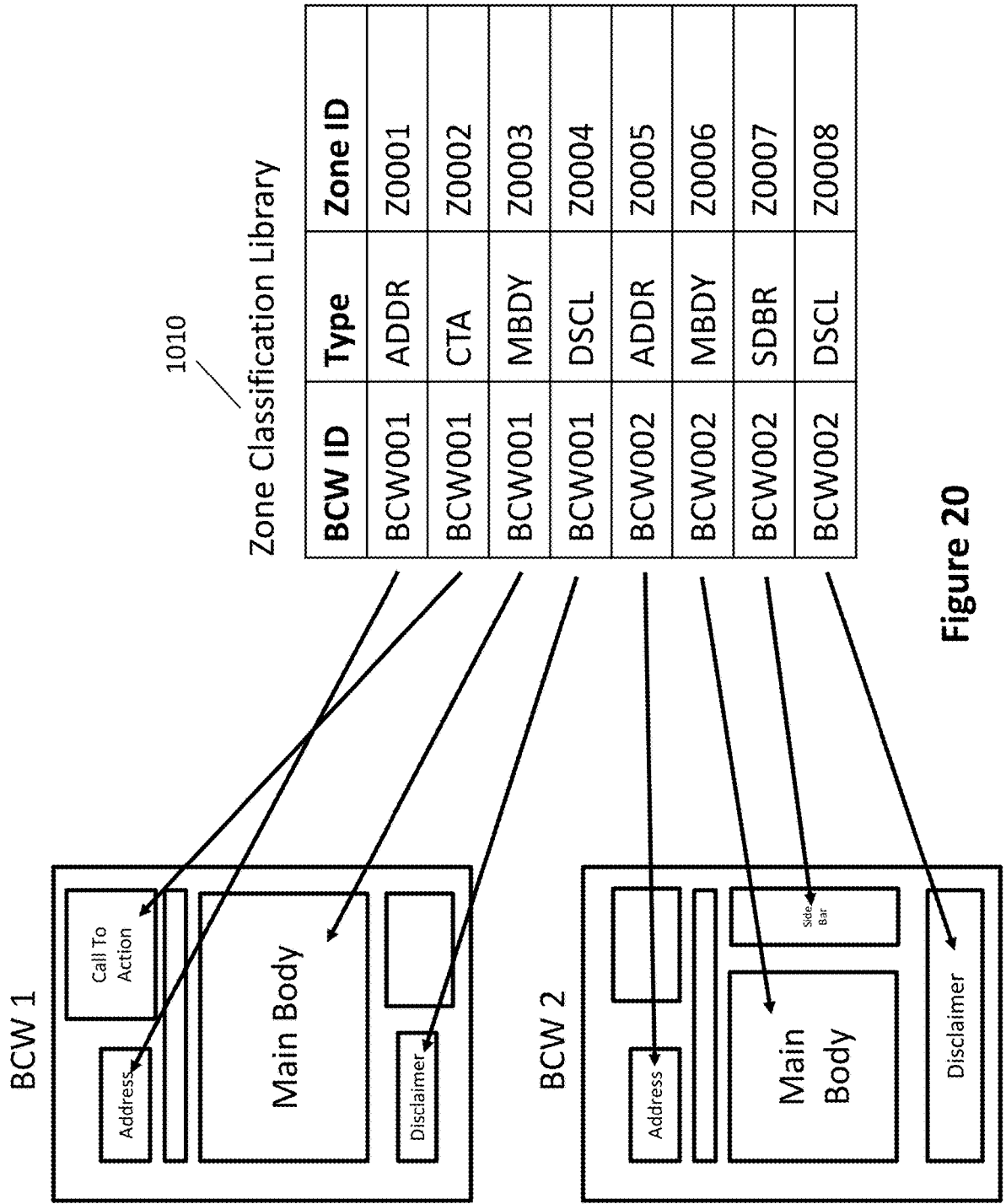
FIG. 20 is a schematic diagram illustrating automatic identifications of zone types in the normalized intermediate format files based on corresponding to different recipients.

Referring to FIGS. 4-5, 20, zone-classification module 460 automatically classifies zones into zone types using Vector Space Modeling (VSM) machine learning (step 580). Each zone of a given NIFF may serve a specific communicative purpose such as an address block, call-to-action, disclaimer, etc., and the identification of these types of purposes can help more easily organize the content into like classes to be analyzed automatically for adherence to specific branding, legal, regulatory, and other requirements. The resulting classifications are recorded in a Zone-classification Library (FIG. 20, 1010) which is stored in the Unified Design Database 480.

Referring to FIGS. 4-5, 20, the channel classification module 490 automatically classifies NIFFs into communication channel types using Artificial Neural Networks (ANNs) machine learning (step 585). It is important to know which channel a communication will be ultimately delivered through be it e-mails, physical prints, web form, etc. as each channel has its own requirements and formatting for successful quality control and execution. Using features such as size, design, verbiage, and additional features uncovered through ANNs each collection of processed NIFFs can be categorized into its respective communication channel.

Figure 19:
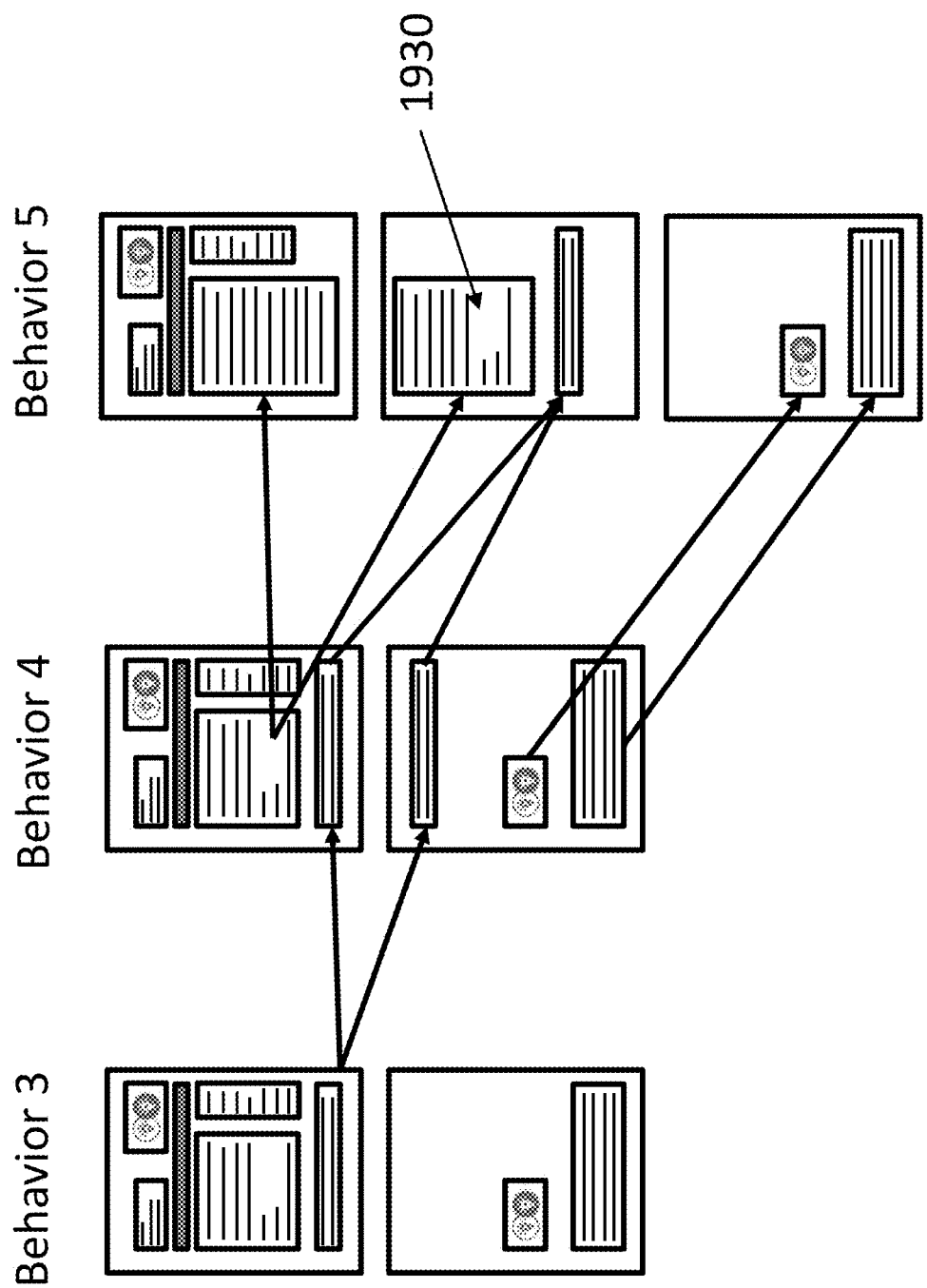
FIG. 19 is a schematic diagram illustrating automatic identification of additional variable white space behaviors in the normalized intermediate format file corresponding to different recipients where the body of variable length content could flow onto multiple pages and push other bodies of content into other positions.

The machine learning and design construction engine 470 automatically construct standardized communication designs (step 590) using font sizes/color/types, paragraph styles, zone placement/measurements, static and variable global objects, base messages, data variables, images, variable whitespace behaviors, and business logic that have been defined and stored during the automated analyses outlined in this document to minimize redundant uses of these components. Then they are classified into their various required communication channels using multi-class classification machine learning (step 580) based on overall size, content types, required variable whitespace behaviors (FIGS. 18 and 19 step 578).

The communication resource allocation server 32 determines available resources (220-240) based on the quantity and complexity of the standard communication designs, and assigns design, printing, and delivery tasks to different resources. The standardized communication designs are sent from the intelligent communication design server(s) 37 to product fulfillment centers 40, 41 (FIG. 1) and/or the communication server 35 to fulfill communication service (step 595). As described above, the communication service can include printing and finishing physical communication materials to be mailed to the recipients. It can also include deliveries of electronic communication messages such as by the communication server 35.

It should be understood that the presently disclosed systems and methods can be compatible with different devices or applications other than the examples described above. For example, the disclosed method is compatible with different computer devices and network configurations, different forms of physical and electronic communication methods other than the ones described above, and different printing and finishing equipment for reproducing information on physical substrates.

What is claimed is:

1. An automated communication design analysis and construction system, comprising:
   one or more intelligent communication design servers, comprising:
   a cross-recipient group analysis module configured to identify behaviors across-recipients, which include identification of static global objects that are invariant between recipients, data variables, and variable global objects that vary between recipients in normalized intermediate format files;
   a zone-classification module configured to automatically identify zones in the normalized intermediate format files according to text objects, logos, and image objects, wherein the zone-classification module is configured to classify the zones into zone types based on behaviors across-recipients; and
   an intelligent communication content learning and constructing engine configured to construct standard communication design files at least in part based on the zones and the zone types; and
   a communication resource allocation server configured to send the standard communication design files to one or more product fulfillment centers,
   wherein physical mailing pieces to be mailed to the recipients are printed and finished based on the standard communication design files.

2. The automated communication design construction system of claim 1, further comprising:
   a normalization module configured to convert communication content files for different recipients to normalized intermediate format files, wherein text objects and image objects are automatically identified in the normalized intermediate format files.

3. The automated communication design construction system of claim 1, wherein the intelligent communication content learning and constructing engine is further configured to construct the standard communication design files based on the static global objects, the data variables, and the variable global objects.

4. The automated communication design construction system of claim 1, wherein the intelligent communication content learning and constructing engine is configured to automatically recognize font type, font size, and font color of a text in the text objects.

5. The automated communication design construction system of claim 1, wherein the intelligent communication content learning and constructing engine is configured to automatically identify wireframes, page behaviors, and paragraph styles within the zones.

6. The automated communication design construction system of claim 5, wherein the variable global objects include wireframes, page behaviors, and paragraph styles that vary between recipients.

7. The automated communication design construction system of claim 1, wherein the zone-classification module is configured to classify the zones into zone types based on locations of the zones and content in the zones in the normalized intermediate format files between different recipients.

8. The automated communication design construction system of claim 1, wherein the static global objects include text, logos, and images that are common to different recipients.

9. The automated communication design construction system of claim 1, wherein the variable global objects include text, logos, and images that vary between recipients.

10. The automated communication design construction system of claim 1, wherein the data variables vary between recipients.

11. The automated communication design construction system of claim 1, wherein the cross-recipient group analysis module is configured to automatically analyze similar zones in the normalized intermediate format files between different recipients to identify static global objects, data variables, and variable global objects, wherein the similar zones have a same content type and locations in respective page layouts.

12. The automated communication design construction system of claim 11, wherein the cross-recipient group analysis module is configured to identify static global objects, data variables, and variable global objects based on whether content in the similar zones the normalized intermediate format files vary across-recipients.

13. The automated communication design construction system of claim 1, wherein the cross-recipient group analysis module is configured to automatically identify a common wireframe in the normalized intermediate format files between different recipients based on locations of the zones and content in the zones.

14. The automated communication design construction system of claim 1, further comprising:
 a cross-recipient group analysis module configured to automatically identify white spaces in the normalized intermediate format files using multi-class classification machine learning, wherein pre-stored content can be inserted into the white spaces.

15. The automated communication design construction system of claim 1, further comprising:
 a data storage configured to store the standard communication design files and to store standard content for a zone type.

16. The automated communication design construction system of claim 15, wherein the standard content is based on branding, legal, and regulatory requirements.

17. The automated communication design construction system of claim 15, wherein the data storage is configured to store a unified file structure for the normalized intermediate format files, wherein the unified file structure defines the static global objects, the data variables, and the variable global objects for communications to different recipients.

18. The automated communication design construction system of claim 1, further comprising:
 a channel classification module configured to automatically classify the standard communication design files based on communication channel types, wherein the communication channel types include physical prints, e-mails, or web form.

19. The automated communication design construction system of claim 1, further comprising:
 a recipient matching module configured to automatically sort the normalized intermediate format files into groups each representing all communication documents for a single recipient, wherein the recipient matching module is configured to automatically match each of the groups of normalized intermediate format files to a recipient.

* * * * *